United States Patent
Yamaguchi et al.

(10) Patent No.: US 6,636,481 B1
(45) Date of Patent: Oct. 21, 2003

(54) DATA CONNECTING METHOD, DATA CONNECTING APPARATUS, PROGRAM RECORDING MEDIUM

(75) Inventors: Takao Yamaguchi, Kyoto (JP); Akira Kamogawa, Osaka (JP); Minoru Etoh, Kawasaki (JP); Junichi Sato, Nara (JP); Tomoaki Itoh, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/491,124

(22) Filed: Jan. 26, 2000

(30) Foreign Application Priority Data

Jan. 26, 1999 (JP) .......................... 11-016922
Oct. 14, 1999 (JP) .......................... 11-292026

(51) Int. Cl.$^7$ .............................................. G01R 31/08
(52) U.S. Cl. ...................................... 370/230; 370/437
(58) Field of Search ................................ 370/229, 230, 370/231, 235, 351–4, 389, 395.4, 395.41, 395.42, 395.43, 395.5, 395.52, 412–420, 437, 465, 469, 470; 709/225, 226, 229, 240, 102–105

(56) References Cited

U.S. PATENT DOCUMENTS

| | | | |
|---|---|---|---|
| 5,550,823 A | * 8/1996 | Irie et al. ...................... | 370/413 |
| 5,629,936 A | * 5/1997 | Lee et al. ...................... | 370/230 |
| 5,933,425 A | 8/1999 | Iwata | |
| 6,385,170 B1 | * 5/2002 | Chiu et al. ................... | 370/235 |
| 6,405,251 B1 | * 6/2002 | Bullard et al. ............... | 709/224 |
| 6,463,068 B1 | * 10/2002 | Lin et al. ...................... | 370/414 |
| 6,480,899 B1 | * 11/2002 | Seddigh et al. .............. | 709/240 |
| 6,496,477 B1 | * 12/2002 | Perkins et al. ............... | 370/228 |
| 6,542,466 B1 | * 4/2003 | Pashtan et al. ............... | 370/235 |
| 6,567,415 B1 | * 5/2003 | Elwalid et al. .............. | 370/412 |
| 6,577,648 B1 | * 6/2003 | Räisänen et al. ........... | 370/503 |

FOREIGN PATENT DOCUMENTS

JP 2723097 11/1997

OTHER PUBLICATIONS

IETF Network Working Group Request for Comments: 2597, J. Heinanen et al., Jun. 1999.
IETF Network Working Group Request for Comments: 2598, V. Jacobson et al., Jun. 1999.
Advanced Streaming Format (ASF), Specification, Feb. 26, 1998, Co–authorized by Microsoft Corp. and RealNetworks, Inc., pps.1–56.

* cited by examiner

Primary Examiner—David Vincent
(74) Attorney, Agent, or Firm—RatnerPrestia

(57) ABSTRACT

A data reception part 101 for receiving data, a data transmission determination part 102 for determining where the data should be transmitted according to, at least, the address written in the data, a data transmission part 103 for transmitting data, and a transmission band management part 104 for managing information on a transmission band. And an information drop method is characterized by having, as an input, contents to which the priority of the contents is added and processing where the contents are divided into packets of the Internet protocol and the priority of the contents is made to correspond to a priority field of packets of the Internet protocol, and said packets to which the priority is added are classified into drop classes having at least two or more different drop probabilities and said packets are dropped in accordance with the network load.

12 Claims, 24 Drawing Sheets

Fig. 4

| reserved band number | reserving band | number of assigns | sum of bands assigned | effective term |
|---|---|---|---|---|
| 1 | 10 M | 3 | 10 M | until 60 seconds later |
| 2 | 15 M | 2 | -10 M | until 90 seconds later |
| 3 | 5 M | 1 | 1 M | until 60 seconds later | number of assigns of relay processing unit in present data  6 remaining band which is allocable  50M

Fig. 5

| terminal name | usage amount of reservation type band | usage amount of non reservation type band | usage ratio of reservation type band |
|---|---|---|---|
| terminal unit A | 10 M | 2 M | 10 / 2 = 5 |
| terminal unit B | 10 M | 3 M | 10 / 3 = 3.3 |
| terminal unit C | 20 M | 4 M | 20 / 4 = 5 |
| ------ | ------- | ------- | ------- |

Fig. 6

| relay unit where terminal A is able to be relayed | allocable band width | communication price | goodness of fit |
|---|---|---|---|
| relay 1 | 10 M | 100,000 /hour | 100,000 / 10M = 1 |
| relay 2 | 20 M | 100,000 /hour | 100,000 / 20M = 0.5 |
| relay 3 | 30 M | 300,000 /hour | 300,000 / 30M = 1 |
| ----- | ----- | ----- | ----- |

Fig. 7

| number of data relay processing unit | load of data relay processing unit | delay/jitter | packet loss | available/ not available for band reception | reporting interval | effective time |
|---|---|---|---|---|---|---|
| 1 | 10 % | 500 msec. | 0 % | available | every 50 seconds | 100 seconds |
| 2 | 90 % | 50 msec. | 10 % | not available | every 120 seconds | 60 seconds |
| 3 | 20 % | 50 msec. | 2 % | available | every 30 seconds | 100 seconds | arrangement information

| connection | address |
|---|---|
| 901 | 901 → 902 or 901 → 903 |
| 902 | 902 → 904 | band reservation

| relay node | reservation band | allocable remaining bands |
|---|---|---|
| 901 | 10 M | 30 M |
| 902 | 10 M | 20 M |
| 903 | 30 M | 0 M |
| 904 | 10 M | 40 M | occupied circuit

| circuit number | reservation route | number of transfers | sum of bands transferred | effective term |
|---|---|---|---|---|
| 1 | 901 → 902 → 904 | 1 | 10 M | until 60 seconds later |
| 2 | 901 → 903 | 1 | -10 M | until 30 seconds later |

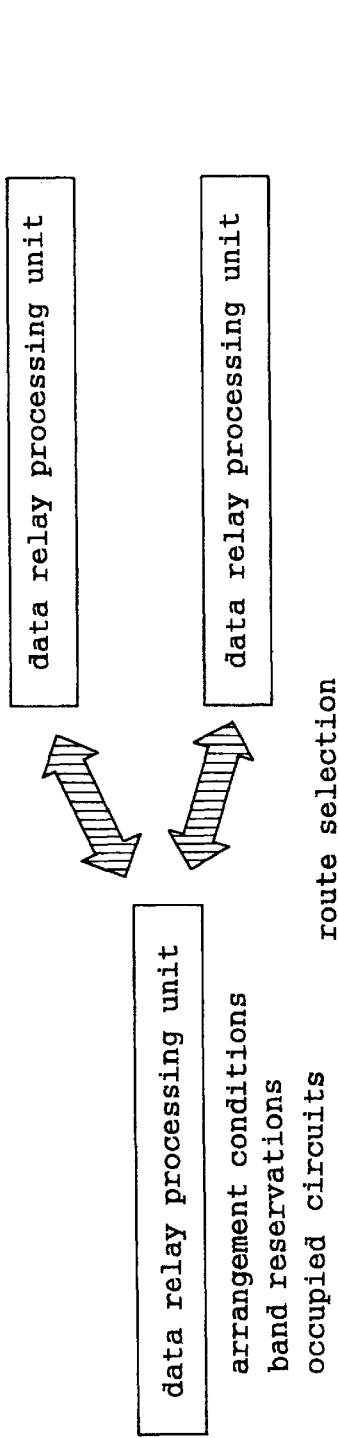
Fig. 12(a) data relay processing units themselves determine data relay processing unit to be relayed next (securing bands and occupied circuits)
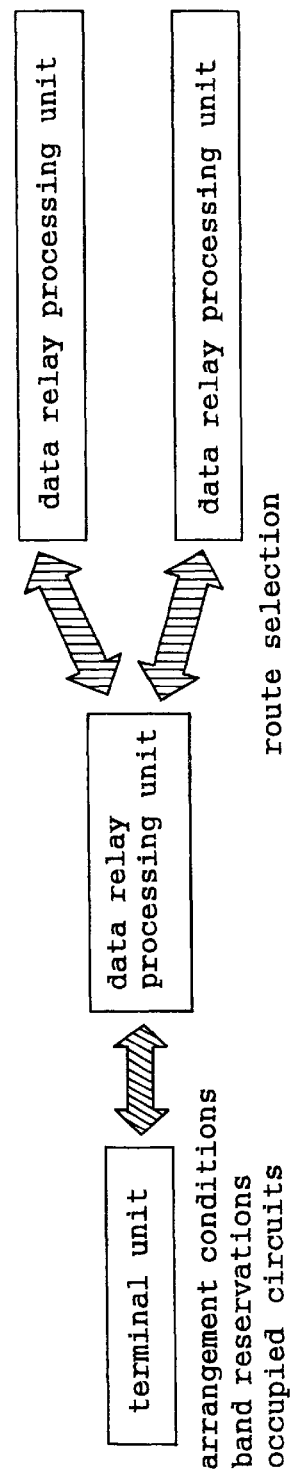
Fig. 12(b) terminal units determine data relay processing unit to be relayed (securing bands and occupied circuits)

Fig. 16  example of added priority

DATA CONNECTING METHOD, DATA CONNECTING APPARATUS, PROGRAM RECORDING MEDIUM

BACKGROUND OF THE INVENTION

1. Field of the Invention

The present invention relates to, for example, a data relay processing method for determining allocations or the like of transmission bands in networks, a data relay processing unit and a program recording medium.

The present invention also relates to an information drop method and an information drop unit for selecting important information to be transmitted.

2. Related Art of the Invention

In the Internet a protocol (for example a protocol called RSVP) for making a band reservation has been proposed conventionally, but route control according to QoS (transmission quality) hasn't been considered. That is to say in the present Internet transmission quality such as transmission bands, delays and jitters are reserved in advance and transmission resources are reserved on a predetermined transmission route.

Therefore, in the case that there are extra transmission bands of a network, the resources of the whole network cannot be uses effectively with some cases where unused routes exist. To solve this problem a system where QoS routing (route control) is available has been proposed conventionally.

For example, "QoS routing unit" (Japanese patent application H7(1995)-315558) by Atsushi Iwata can be cited. According to the conventional system, transmission bands, delays, jitters or the like are defined as QoS and a routing unit is proposed which is able to search routes satisfying the requirements of QoS that are expected to be satisfied in sequence.

In the above described conventional system, however, the following problems (1) and (2) are cited.

That is to say problem (1): the conventional system is a method for reserving in advance fixed transmission bands (for example, a band of 20 Mbps) at the time of transmission resource reservation. Namely, for example, at the time a transmission band of 20 Mbps is reserved, even in the case that it is understood in advance that a used band of 10 Mbps is going to decrease after a certain period of time, transmission by the band of 20 Mbps which has been used so far is stopped once and transmission is carried out by newly reserving a band of 10 Mbps after said certain period of time.

This is because there is no method for reflecting the usage plan or the usage record of the network resources by other users, and even in the case where there are scheduled to be, or tend to be, extra network resources those extra network resources will not be used, therefore, efficiency of the usage of the whole of the network resources cannot be expected to improve.

Problem (2): in the case that a plurality of transmission resources are selectable at the time of transmission resource reservation, it used to be difficult to improve the usage effectiveness of the transmission route while controlling the setting of the communication price because there was no such thing as a reference based on the idea that the communication price is adjusted among resources where the reservation of the transmission resources are available. When searching a route, even if the load of the terminal carrying out relay processing of data is high, a large amount of time is spent for data relay processing in the case that a relay terminal with a high load is selected as a search object because there is a possibility it may be selected as an object of a search of data relay processing.

On the other hand, a system for controlling traffic amount by performing packet drop according to the load of the network following the priority attached to the Internet protocol packet has been proposed conventionally (IETF: Internet Engineering Task Force, RFC2597, RFC2598).

In this conventional system, however, said priority is determined by judging whether the contents are important or not based on the type of streams such as image signals or speech signals, or control signals (Microsoft Inc.: ASF; Advanced Streaming Format).

Accordingly, in the conventional system, there's a problem (3) that the processing lacks flexibility because only the types of streams are focused on.

For example, a method for making the importance level to the terminals, to the types of image or speech frames (I, P, B) or to set unit of those frames in a certain range (for example GOB: Group Of Block in MPEG1) correspond to the Internet protocol packets is not set therefore there is a problem (3) that more important information cannot be selected flexibly to be transmitted by giving a higher priority to each terminal important image frame or speech part.

SUMMARY OF THE INVENTION

It is the purpose of the present invention as listed one to thirteen that considering such problems (1) and (2) with the above mentioned conventional unit, a data relay processing method, a data relay processing unit, and program recording medium are provided so as to be able to further increase the usage efficiency of resources in the whole network compared to conventional ways.

For that purpose, one aspect of the present invention is a data relay processing method wherein, in the case that at least one piece of information is sent from respective terminals, among a piece of information on schedule of usage of transmission band, another piece of information on schedule of transmission band which is able to be assigned, another piece of information on schedule of a term where an transmission band is able to be assigned or exchanged, and another piece information on a necessary cost when a transmission band is assigned or exchanged, the sent information is held, and wherein said respective schedules of said respective terminals are received, based on at least said information from another terminal which is previously held, said transmission band is reserved, assigned or exchanged or said communication price is determined.

Another aspect of the present invention is a data relay processing method wherein, based on history information of the past processing record with respect to processes of assigning or exchanging of the transmission band between respective terminals and based on information with respect to said transmission band, said transmission band is reserved, assigned or exchanged or a communication price is determined.

Still another aspect of the present invention is a data relay processing method, wherein said history information is announced in said respective terminals, and intervals between the announcements are adjustable.

Yet another aspect of the present invention is a data relay processing method, wherein said history information is renewed at predetermined time intervals or in accordance with whether said assigning or exchanging are possible or not.

Still yet another aspect of the present invention (corresponding to claim 5) is a data relay processing method wherein, in the case that there exists a transmission band utilized by reserving a transmission band, and a transmission band utilized without reserving a transmission band, information on usage frequency of the transmission band utilized by reserving said transmission band is defined by dependence information, and based on the dependence information and information with respect to said transmission band is reserved, assigned or exchanged or a communication price is determined.

A further aspect of the present invention is a data relay processing method characterized in that, in the case that there exist a transmission band utilized by reserving the transmission band and a transmission band utilized without reserving the transmission band, information on usage frequency of said transmission band utilized by reserving the transmission band is defined as a dependence information, intervals of announcements of said dependence information is controlled said transmission band is reserved assigned or exchanged or communication price is determined.

A still further aspect of the present invention is a data relay processing method wherein said dependence information is renewed at predetermined intervals.

A yet further aspect of the present invention is a data relay processing method wherein in the case that there exist more than two transmission resources respective that make either one of the processes of reserving, assigning or exchanging transmission bands possible, by utilizing information on goodness of fit exhibiting a possibility of being selected at least for each of said transmission resources that is able to be processed and information on deadline time of said selection, said transformation resources are selected or a communication price is adjusted.

A still yet another aspect of the present invention is a data relay processing method for controlling announcement intervals of route information for relaying data based on at least one piece of information among loads of terminals for carrying out data processing, a buffer capacity utilized for data processing, transmission quality, and available transmission band.

An additional aspect of the present invention is a data relay processing method for controlling announcement intervals of at least one piece of information, based on at least one piece of information among loads of terminals for carrying out data processing, a buffer capacity utilized for data processing, transmission quality, and available transmission band, among said loads of terminals for carrying out data processing, said buffer capacity utilized for data processing, said transmission quality, and said available transmission band.

A still additional aspect of the present invention is a data relay processing unit comprising: a transmission band management means wherein in the case that at least any one piece of information is sent from respective terminals, among a piece of information on schedule of usage of transmission band, another piece of information on schedule of transmission band which is able to be assigned, another piece of information on schedule of a term where an information band is able to be assigned or exchanged, and another piece information on a necessary cost when a transmission band is assigned or exchanged, said transmission band management means holding and managing the sent information; and a transmission band reservation management means wherein in the case that said respective schedules of said respective terminals are received, based on at least said information from at least another terminal which is previously held by said transmission band management means, said transmission band reservation management means reserving, assigning or exchanging a transmission band or determining a communication price.

According to the above described configurations, transmission bands can be allocated or communication price can be determined corresponding, for example, to usage conditions of transmission quality or resources (transmission band) of the network.

A yet additional aspect of the present invention is a data relay unit comprising: packet classification rules for classifying packets, a packet classification means for classifying packets based on said packet classification rules, band reservation rules for managing rules for reserving transmission bands, and a band reservation means for reserving transmission bands based on said band reservation rules and the results of packet classification.

A still yet additional aspect of the present invention is a data relay unit comprising priority addition rules for managing rules for adding priority information, priority adding means for adding priority, priority processing rules for managing. rules of the processing method of priority and a priority processing means for carrying out priority processing based on added priority.

A supplementary aspect of the present invention is an information drop method comprising:

an input step for inputting contents in which at least a plurality of types of priorities which are used when the contents are processed are added;

a correspondence making step for dividing said contents into packets of the Internet protocol and making priorities of a plurality of types of said contents correspond to a priority field of packets of said Internet protocol;

a step for classifying said packets to, which said priority is made to correspond, into drop classes having at least two or more different drop probabilities based on said priority that is made to correspond; and a drop step for dropping said packet in accordance with the network load based on said drop classes.

A still supplementary aspect of the present invention is an information drop unit comprising:

an input means for inputting contents in which at least a plurality of types of priorities are added when the contents are processed;

a priority corresponding management means making step for dividing said contents into packets of the Internet protocol and making priorities of a plurality of types of said contents correspond to a priority field of packets of said Internet protocol;

a classification means for classifying said packets to which said priority is made to correspond, into drop classes having at least two or more different drop probabilities based on said priority that is made to correspond; and a drop means for dropping said packet in accordance with the network load based on said drop classes.

A yet supplementary aspect of the present invention is an information drop method comprising:

an input step for inputting contents in which at least a plurality of types of priorities are added when the contents are processed;

a correspondence making step for dividing said contents into packets of the Internet protocol and making priorities of a plurality of types of said contents correspond to a priority field of packets of said Internet protocol;

a first classification step for classifying said packets to which said priority is made to correspond, into first drop classes according to previously assigned rules;

a second classification step for classifying packets classified as such, into second drop classes having at least two or more different drop probabilities provided in said first drop class, based on said priority made to correspond; and a drop step for dropping said packets in accordance with the network loads based on said first and second drop classes.

A still yet supplementary aspect of the present invention is an information drop unit comprising:

an input means for inputting contents in which at least a plurality of types of priorities are added when the contents are processed;

a priority corresponding management means for dividing said contents into packets of the Internet protocol and making priorities of a plurality of types of said contents correspond to a priority field of packets of said Internet protocol;

a first drop class management means for classifying said packets to which said priority is made to correspond, into first drop classes according to previously assigned rules;

a second drop class management means for classifying packets classified as such, into second drop classes having at least two or more different drop probabilities provided in said first drop class based on said priority made to correspond; and a drop means for dropping said packets in accordance with the network loads based on said first and second drop classes.

The 18$^{th}$ invention of the present invention (corresponding to claim 30) is an information drop method characterized by comprising:

an input step for inputting contents in which at least a plurality of types of priorities are added when the contents are processed;

a correspondence making step for dividing said contents into packets of the Internet protocols, and for making a plurality of types of priorities of said contents correspond individually to a priority field of packets of said Internet protocol independently;

a first classification step for classifying said packets, to which said priority correspond is made correspond, into a first drop class based on one of said plurality of types of priorities being made to correspond;

a second classification step for classifying packets, which has been classified in such a way, into a second drop class having at least two or more different drop probabilities provided in said first drop class based on other priorities than said plurality of types of priorities which have been made to correspond;

a drop step for dropping said packets according to the network loads based on said first and second drop classes.

Another aspect of the present invention is an information drop unit characterized by comprising:

an input means for inputting contents in which at least a plurality of types of priorities are added when the contents are processed;

a priority corresponding management means making step for dividing said contents into packets of the Internet protocols, and for making a plurality of types of priorities of said contents correspond individually to a priority field of packets of said Internet protocol independently;

a first drop class management means for classifying said packets, to which said priority correspond is made correspond, into a first drop class based on one of said plurality of types of priorities being made to correspond;

a second drop class management step for classifying packets, which has been classified in such a way, into a second drop class having at least two or more different drop probabilities provided in said first drop class based on other priorities than said plurality of types of priorities which have been made to correspond;

a drop means for dropping said packets according to the network loads based on said first and second drop classes.

BRIEF DESCRIPTION OF THE DRAWINGS

FIG. 4 shows a diagram for describing a method of determining reservation, assign, exchange and communication price of the transmission band based on the processing record of assign or exchange processing of the transmission band which was carried out in the past;

FIG. 5 shows a diagram for describing reservation, assign and exchange method of the transmission band utilizing the frequency of use of transmission band available for the transmission band reservation;

FIG. 6 shows a diagram for describing a method of adjusting communication price among resources available for reservation of the transmission resources in the case that a plurality of transmission resources are selectable at the time of transmission resource reservation;

FIG. 7 shows a diagram for describing information in processing conditions managed by the data relay processing unit;

FIG. 10(*b*) is a diagram for describing a collective-type in the relationship between an occupied circuit control unit and a data relay processing unit;

FIGS. 12(a) and (b) show a diagram describing relationships between a data relay processing unit and an occupied circuit control unit;

Figure 1:
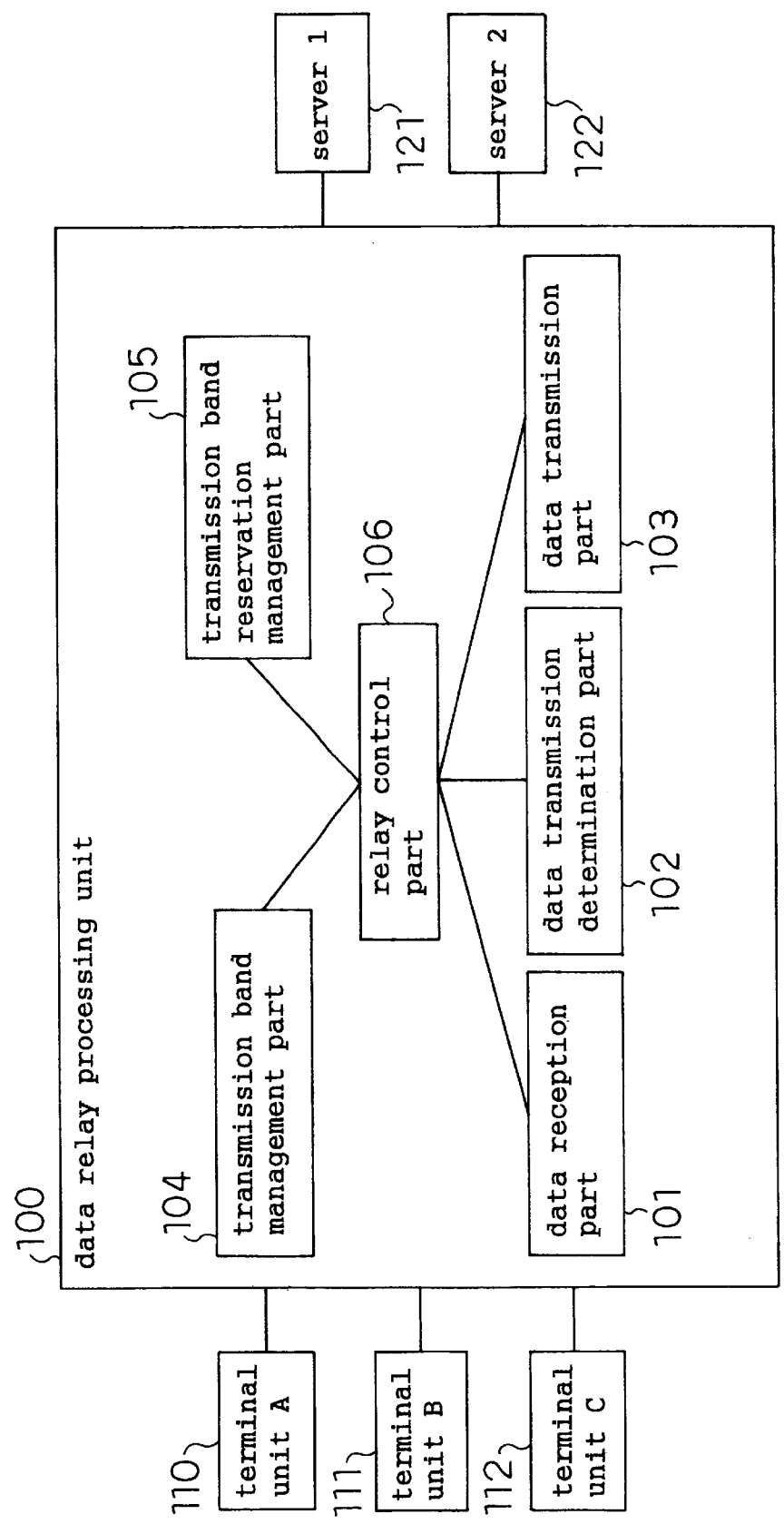
FIG. 1 illustrates a configuration of a data relay processing unit for carrying out data relay.

DESCRIPTION OF NUMERALS 1, 501 priority correspondence management part
2 drop class management part
30 contents
31 video stream
32 audio stream
33 priority of IP packets
34, 71 priority of streams
35, 72 priority of frames
41, 61,73 priority of IP packets
42, 62 written address
43 classification
63 predetermined classification
74 classification based on the priority of streams
75 classification based on the priority of frames
100 data relay processing unit
101 data reception part
102 data transmission determination part
103 data transmission part
104 transmission band management part
105 transmission band reservation management part
106 control part
110 terminal unit A
111 terminal unit B
112 terminal unit C
121 server 1
122 server 2
301 reservation status management part
302 arrangement status management part
303 occupied circuit management part
304 occupied circuit control part
502 first drop class management part
503 second drop class management part
1001–1003 occupied circuit management unit
1011–1013 data relay processing unit
1101 band management part
1102 packet classification rules
1103 packet classification part
1104 band reservation rules
1105 band reservation part
1106 priority addition rules
1107 priority addition part
1108 priority processing rules
1109 priority processing part
1110 priority processing control part
1111 terminal unit

BEST MODE FOR CARRYING OUT THE INVENTION

The first to the thirteenth modes according to the present invention is described referring to the drawings in the following.

FIG. 1 shows a view of a configuration of a data relay processing unit (or simply called a "relay unit") for carrying out data relay. First, a configuration of the mode according to the present invention is described using the Fig. The data that is the object of the present mode is image, text, speech or the like.

That is to say, as shown in FIG. 1, the data relay processing unit 100 comprises a data reception part 101 for receiving data, a data transmission determination part 102 for determining where the data is transmitted according to the address written in the data (for example, IP address in the case of Internet protocol) and a data transmission part 103 for transmitting the data.

The data reception part 101 for receiving data and the data transmission part 103 may have as objects packet exchanges represented as Ethernet or as objects circuit exchanges such as ISDN. The data reception part 101 and the data transmission part 103 do not necessarily have the same communication interface.

And the data transmission determination part 102 determines the communication interface to be outputted in the case that a plurality of communication interfaces exist at the data output part.

Functions of the data reception unit 101, the data transmission determination part 102, and the data transmission part 103 correspond to the router in the case of packet exchange to switch board in the case of circuit exchange.

It is also possible for the data relay processing unit 100 to use a method for carrying out band reservation at the level of a unique band reservation method which is not standardized or the level of RSVP standardized in the Internet field or the level of the ATM (a synchronized assign mode) or the level of the data link layer.

In addition, the data relay processing unit 100 makes it possible to assign or exchange a part, or all, of the band previously reserved and comprises a transmission band management part 104 for managing information with respect to the transmission band assigned or exchanged in the past or the transmission band presently being assigned or being exchanged. The transmission band reservation management part 105 determines reservation, assign, and exchange of the transmission band or decides the communication price based on the above mentioned information managed by the transmission band management part 104.

For example, the communication cost will be held at a low level for the users using the band that is able to receive the assign of the band positively. And the data relay processing unit 100 comprises a relay control part 106 for controlling and managing each of those parts.

To the data relay processing unit 100 a plurality of terminal unit A (110), B (111), and C (112) and a server 1 (121) and a server 2 (122) are connected respectively (see FIG. 1).

In the present mode due to the above configuration it can be expected that information on assign for each reserved band or each data relay processing unit is used for the determination whether or not a new band reservation is possible or is used for the determination of the communication price so as to prevent the unfairness of the usage of the transmission band or rapid deterioration of the transmission quality. This will be describe in further detail in the following.

Next, with respect to the above mentioned configuration the operation of the present mode is described and one mode of a data relay processing method according to the present invention is listed in reference to the drawings.

Figure 2:
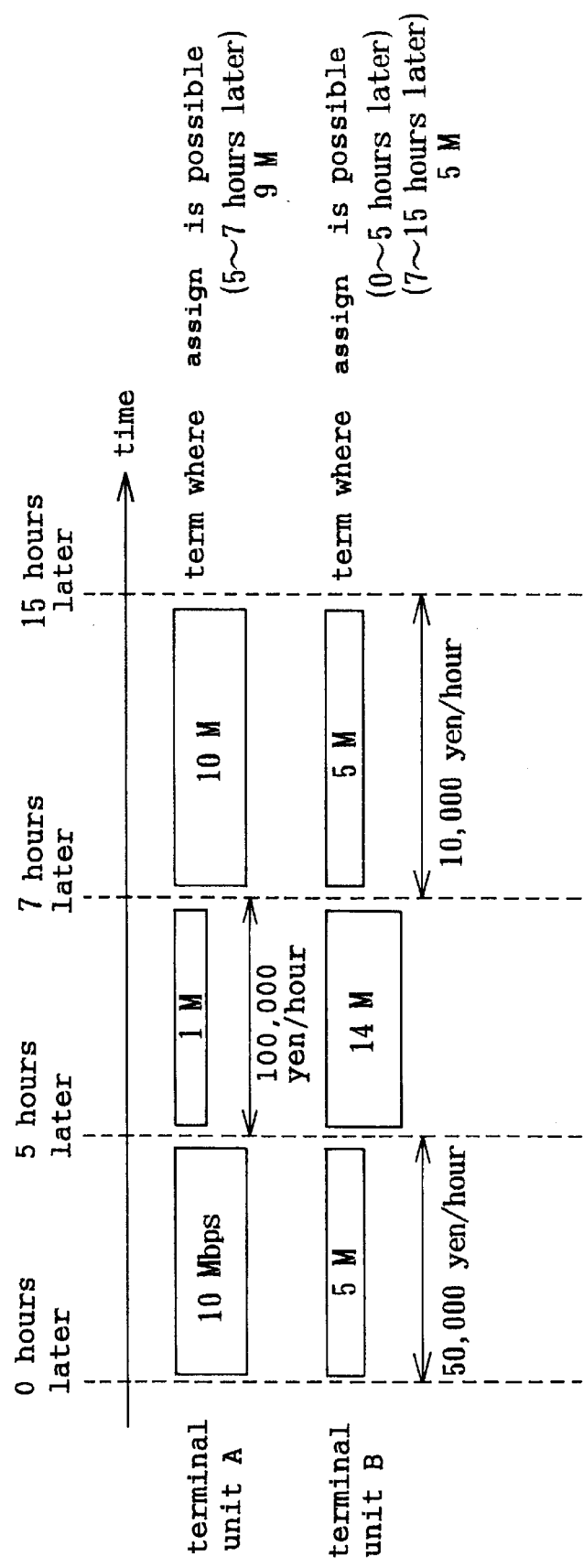
FIG. 2 shows a diagram for describing a method of determining reservation, assign, and communication price of the transmission band where a assign of the transmission band is used.

First, using FIG. 2 a method for determining reservation, assign and communication price of the transmission band utilizing assign of the transmission band is described.

The conventional method is the method for reserving a fixed transmission band in advance at the time of transmission resource reservation. In the conventional method, a usage schedule of the network resources cannot be reflected and extra network resources cannot be utilized even if the network resources are scheduled to be, or tend to be, in excess, therefore the usage efficiency cannot be expected to increase for all of the network resources.

On the contrary, in the present mode, information on a period when the transmission band is able to be assigned and the necessary costs which are sent from each of the terminal A to C are held by the transmission band control part 104. And the transmission band reservation control part 105 manages the transmission band and the communication price based on the usage schedule by the user of the transmission band by utilizing the information held in the above at the time of transmission band reservation as a usage plan of the network resources. Thereby the usage efficiency of the transmission party can be expected to improve.

FIG. 2 shows the information, which is related to the usage schedule of the transmission band from that point in time forward and the time zone where the assign is available, held in the transmission band management part 104, that is transmitted from the terminal unit A and the terminal unit B.

As shown in FIG. 2, the terminal A requires a transmission band of 10 Mbps during the period of time from 0 hours to 5 hours after the band reservation has been made and the period of time from 7 hours to 15 hours after the band reservation has been made, and requires a transmission band of 1 Mbps during the period of time from 5 hours to 7 hours after the band reservation has been made. Here it is presumed that a assign is available during the period of time from 5 hours to 7 hours after the band reservation has been made and the cost of carrying out the assign is 100,000 yen per hour (as for cost a system may be applied that varies according to amount of time).

By carrying out the assign based on the cost the fairness of the opportunities for carrying out the assign can be expected to increase. As shown in the example in the Fig, even in the situations where only 15 M of transmission band out of the entry transmission path is available, effective usage of the transmission path can be expected by mutually assigning the transmission bands between the terminal A and the terminal B. The assign may be carrier out among three or more parties.

To write down a variety of schedules for determining reservation, assign or exchange of the transmission band or the communication price, by appointing the term of the usage schedule of the transmission band with respect to a relative time it becomes easy to correct the usage schedule of the transmission band even when the starting time of the usage schedule is changed. In the present invention, as for an example of a relative time, 5 hours after the present point (the terminal A . . . from 0 hours to 5 hours after the band reservation has been made) is used as an expression.

That is to say, just by changing the starting time the term of the scheduled usage need not be changed. On the other hand the absolute time expression represents a time expression defined uniquely such as 14:00, Apr. $1^{st}$, 1999.

By appointing the starting point of the schedule usage of the transmission band with an offset time of the start of usage, the starting term (relative time) of the scheduled usage can be changed to an absolute time expression, therefore, it becomes easy to adjust the time of start. For example, the offset value of start of usage is 14:00 and when the term of scheduled usage is 2 hours in relative time, the time of usage is expressed as from 14:00 to 16:00.

In addition, by appointing the extension of the scheduled usage term of the transmission band with the offset time, the assignment of time can easily be changed. For example, when it is presumed that the offset value at the start of usage is 14:00 and the term of scheduled usage is 2 hours in relative time and the offset value of the extended time is 1 hour then the time of usage is expressed as from 14:00 to 17:00. For the expression of offset time the expression of minus may be used, and the offset value may be properly changed according to the usage status. Those methods of time expressions can be applied to the embodiments of claims 1 to 8 claim 11 in the same way.

In the case that a terminal C of the third party newly sends reservation information on a transmission band to the data relay processing unit 100, the transmission management part 104 provides transmission band information which is able to be assigned of the terminal which is suitable for the usage conditions of terminal C based on management information shown in FIG. 2, and in the case that the terminal C agrees with the assign price that is provided then the usage schedule of the transmission band from that point in time on of the terminal C is determined by the transmission band reservation management part 105.

In this way, by using information on transmission band width which is able to be assigned of the transmission band, information on a term which is able to be assigned, and information on necessary cost for the assigning, the transmission band reservation management part 105 permits the reservation, or assigns the transmission band or determines a communication price based on the usage schedule of the transmission band so that the usage effect of the transmission path can be expected to be improved. The terminal may be given a reservation permission of the transmission band in accordance with the ratio which the transmission band is able to be assigned to.

Figure 3:
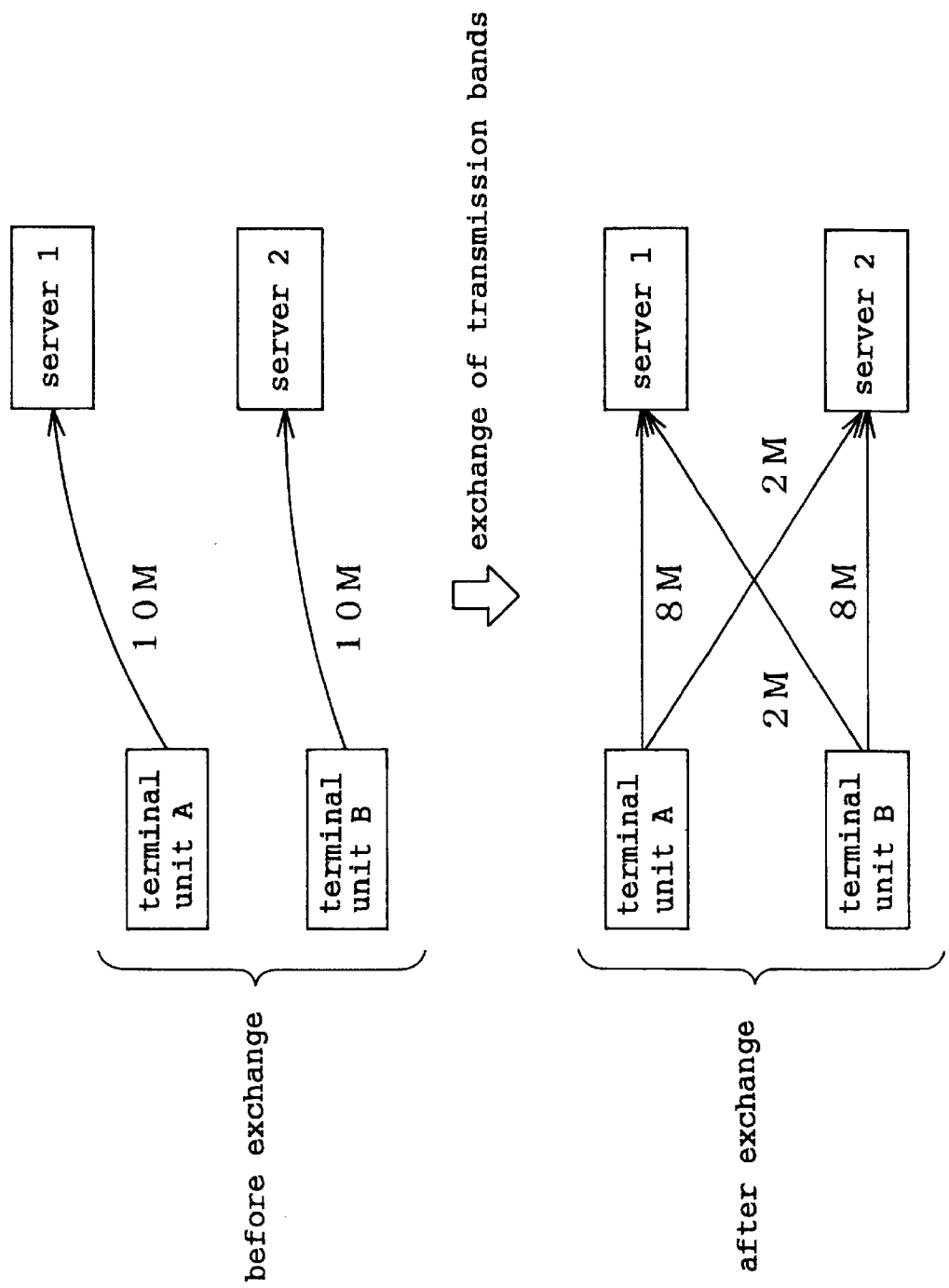
FIG. 3 shows a diagram for explaining a method for determining reservation, exchange and communication price of the transmission band where an exchange of the transmission band is used.

Next, by using FIG. 3 a method for reserving or exchanging the transmission band or determining a communication price utilizing the exchange of the transmission band is described.

The exchange of the transmission band means to exchange a part of, or all of, the transmission band which is being used under the mutually determined conditions (term, cost). In an example of the Fig, the terminal A and the terminal B are connected to the server 1 and the server 2, respectively, with 10 Mbps. Under these conditions neither the server 1 nor the server 2 can afford the transmission band for accepting new connection requests.

By mutually exchanging 2M, which is a part of the band that terminal A is using, and 2M, which is a part of the band that terminal B is using, terminal A is able to be connected to the server 2 and the terminal B is able to be connected to the server 1.

The information that the exchange of the transmission band have information of transmission band width required at the time of reservation of the transmission band, information on exchangeable transmission band width of the transmission band, information of a term where the transmission band is able to be exchanged and information on a necessary cost when the transmission band is exchanged in the same way as the described contents with respect to assigning of the band (not necessarily at the time of transmission band reservation but may be at the point in time when the possibility of the band exchange occurs) and the exchange of the transmission is performed by using those piece of information.

In the case that a new band request occurs at the terminal, when the allocation of a new band is impossible, the bands may be exchanged or even in the case that a new request for gaining a band doesn't occur, the communication cost may be eliminated by the exchange of the bands. The band may be exchanged not only between 2 but among 3 or more.

Next, FIG. 4 is a diagram for describing a method for reserving, assigning or exchanging the transmission band or determining the communication price based on the processing record of the processing in the past of assigning or exchanging of the transmission bands.

Using the Fig an example of assigning of the transmission band is described. Information on complete assigning is shown in FIG. 4.

In the example of the Fig, numerals are allocated for reserved bands and "presently reserved band," "number of times of assign," "sum of bands assigned," "effective term of information of assign" are shown for each reserved band. Those pieces of information are called information on assign with respect to bands in the present invention. The rest of the bands which are able to be allocated are shown.

In the example of the Fig, in the case of being assigned from the other terminals the value becomes negative (in the case of band numeral 2).

The number of assigns may be for each reserved band, or a reservation of assign bands may be determined in accordance with the assign situation or the communication price may be determined by using the assign number for each data relay transmission unit. By using the "sum of bands assigned" information, it is processed in the same way.

Information of assign may be summed up for each user or may be summed up for each relay unit. By using information on "effective term of information on assign" it can be treated without being influenced greatly by the previous old information. In the case that the effective term is expired, the information on assign may be initialized or modified. Initialization or modification may be carried out in accordance with whether the actual assign is possible or not.

Information on assign maybe varied in a number of ways in a manner reflecting the past processing record by controlling the intervals when the information on the past records are announced (this is simply called an advertisement interval). The shorter the advertisement interval the easier the past processing records can be reflected in the reservation of the transmission band or the determination of communication price, but the information amount occurring for the advertisement becomes a problem. In the present mode, the assign of the transmission band is described but the exchange of the assign bands can be realized in the same way.

As for a method for controlling the range (achieved distance) of announcing the past records, the value of TTL (Time To Live) can be utilized in the Internet protocol. The value of TTL is reduced whenever the router is passed (when the value becomes 0 information on the past records won't propagate). In the system for controlling the achieved distance, TTL need not be used but the achieved distance may be controlled in the same way by the application unit. In addition, as for a means for announcing the past records a communication method of Point-to-Point, multicast or broadcast may be used.

A control method of the achieved distance may be applied in the same way for embodiments according to claims 5, 6, 9, and 10. In addition, not only information of assign but also route information for relaying data, values of loads of terminals carrying out data processing, a buffer capacity used for data processing, transmission quality and available transmission band width may be reported to other neighboring terminals by controlling the achieved distance according to the values of routing information for relaying those pieces of data, loads of terminals for carrying out data processing, a buffer capacity utilized for data processing, transmission quality and available transmission band width.

Next, by using FIG. 5 reservation assign and exchange methods of the transmission bands using frequency of the usage of transmission bands which is able to reserve transmission bands is described.

In an example of the same Fig, the usage amount of the transmission band utilized by reserving the transmission band, the used amount of the transmission band used without reserving the transmission band and a ratio of terminals using the reservation-type band are represented for each terminal.

In an example of the same Fig, the terminal A uses 10M as a reservation-type band and 2M as a non-reservation-type band. The ratio is defined as a value of the usage amount being utilized as a reservation-type band divided by the usage amount of a non-reservation-type band. In the case of terminal A the ratio is 5. This value represents the dependence of the reservation-type band.

The reservation-type band and the non-reservation-type band may be mixed in the same transmission path or may assign a different transmission path as an object. For example, in the case of a terminal with a high dependence of the reservation-type band the reservation of the reservation-type band can be rejected or unfairness of the usage of the transmission band can be reduced by setting the communication price for reservation at a high rate.

Information of dependence can be varied in numerous ways in a reflection manner of the past processing records by controlling the advertisement records. The shorter the advertising intervals the easier the transmission band of the past processing records may be reserved in transmission bands or communication price may be determined, but the information amount occurring for the advertisement becomes a problem.

By setting and using information on "effective term of information on dependence" it can be treated so as not to be influenced greatly by the previous old information. In the case that the effective term is expired the information on dependence may be initialized or modified.

Next, by using FIG. 6, in the case that a plurality of transmission resources are selectable at the time of transmission resource information, a method for adjusting communication price among resources that are able to be reserved in the transmission resources is described.

In a conventional system, in the case that a plurality of transmission resources are selectable at the time of transmission resource reservation, it is difficult to improve the usage efficiency of the transmission path while controlling the setting of the communication price because there are no frames for adjusting communication price between resources that are able to be reserved in the transmission resource.

On the contrary, in the present mode, in the case that a plurality of transmission resources are selectable when reserving the transmission resource (band), the usage efficiency of the transmission path is improved by reporting the goodness of fit among resources that are able to be reserved in the transmission resource using information on goodness of fit showing the possibility of selection for each transmission resource that is able to be processed and information on deadline time of the selection, and by preventing the setting of communication price from being high when the resource is being utilized.

For example in the same Fig, the case is described when, as a relay unit where the terminal A is able to be relayed, relays 1 to 3 are cited. A communication price per 1 hour in the case when all the bands which are allocable have been allocated, allocable band width, and cost necessary per 1 M are represented as goodness of fit. The terminal which has issued the band request determines the relay unit to relayed based on the goodness of fit. When a modification of the goodness of fit occurs within the determined time period, the modification may be possible and communication price is proposed mutually between data relay units so that a sudden surge in communication price can be controlled.

For the calculation of the goodness of fit the information of bandwidth of communication need not necessarily be used.

Next, FIG. 7 shows a diagram for describing information on processing conditions that the data relay processing unit controls.

The conventional problem described above cites that plenty of time is needed to be spent for data relay processing in the case that a relay terminal with high loads is selected as a search object because there is a possibility of selection as an object for data relay processing search even when the load of the terminal carrying out data relay processing is high at the time of route search.

To deal with this problem by changing advertisement intervals of the route information according to the processing conditions of the data relay processing terminal (load of the terminal, buffer capacity utilized for data processing, available transmission band width and transmission quality), it becomes easy to eliminate terminals for carrying out data relay processing of the overload from the objects of relay terminals.

By doing this, it becomes possible to easily select terminals for data relay processing without a high load to carry out data relay processing, therefore the usage efficiency of the transmission path for the entire network can be expected to be increased.

In an example of the same Fig, for each data relay processing unit, load conditions for each data relay processing unit (the load may be defined as the remaining capacity of the buffer for processing packets or may be defined as a processor load for processing data), a delay or jitter caused by the processing at the data relay processing unit (for example, feeding allocation processing), packet loss, information on whether the band reservation is receivable or not, notification intervals of processing conditions for those data relay processing units effective term of information on reported processing conditions are managed.

For example, in the case of data relay processing unit 1, the load of the relay unit is 10%, a delay-jitter is 500 msec, the packet loss is 0%, the band reservation is receivable and the notification intervals of the information on those data relay units is every 50 seconds. And the effective term of those pieces of information is 100 seconds and those pieces of information are reported to other data relay processing units.

As for the notification method, a multicast communication method may be used or it may be reported by carrying out one on one communication. At the same time information on reserved bands may be reported to other data relay processing units with its own data relay processing unit. In accordance with the processing conditions of the data relay processing unit, the notification intervals of information on the processing conditions of the data relay processing units can be verified so that the load of the data relay processing unit may be expected to be reduced.

For example, by lengthening the notification intervals of the data relay processing units with overload, it becomes possible to put it away as an object of the data relay, therefore it can be expected that the load of the data relay processing unit can be reduced.

Next, by using FIGS. 8 to 12 a method for reserving transmission bands and a method for assigning are described more concretely with the examples of reservation and assign of the transmission band. And the present mode can be implemented in the same way when exchanging the transmission band.

Figure 8:
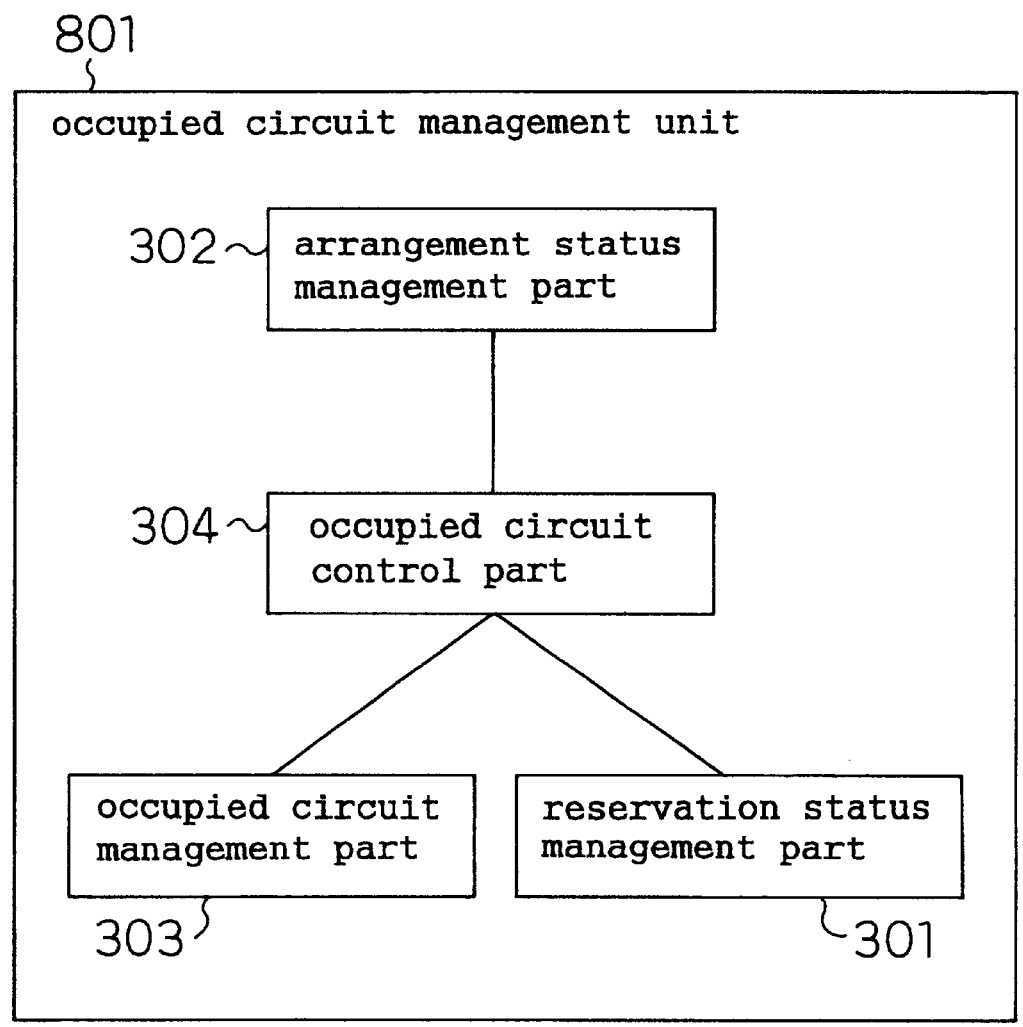
FIG. 8 shows a diagram with respect to an occupied circuit control unit for managing allocation conditions of the resources of a data relay unit.

FIG. 8 shows a diagram with respect to an occupied circuit management unit 801 for managing the allocation conditions of resources of the data relay unit. The data is relayed according to the addresses written the data (for example IP address in the case of Internet protocol) so that the allocation conditions of the resources of the data relay processing unit 31, which is able to reserve the transmission band, becomes an object of management. The occupied circuit management unit 801 comprises a reservation condition management part 301 for managing the reservation conditions for each data relay processing unit, an arrangement condition management part 302 for managing arrangement conditions of the data relay processing unit at the transmission path, an occupied circuit management part 303 for recording as an occupied circuit and managing a sequence of data relay processing units for which transmission bands are reserved between terminals for sending and receiving data and an occupied circuit control part 304 for controlling and managing each of those parts.

Figure 9:
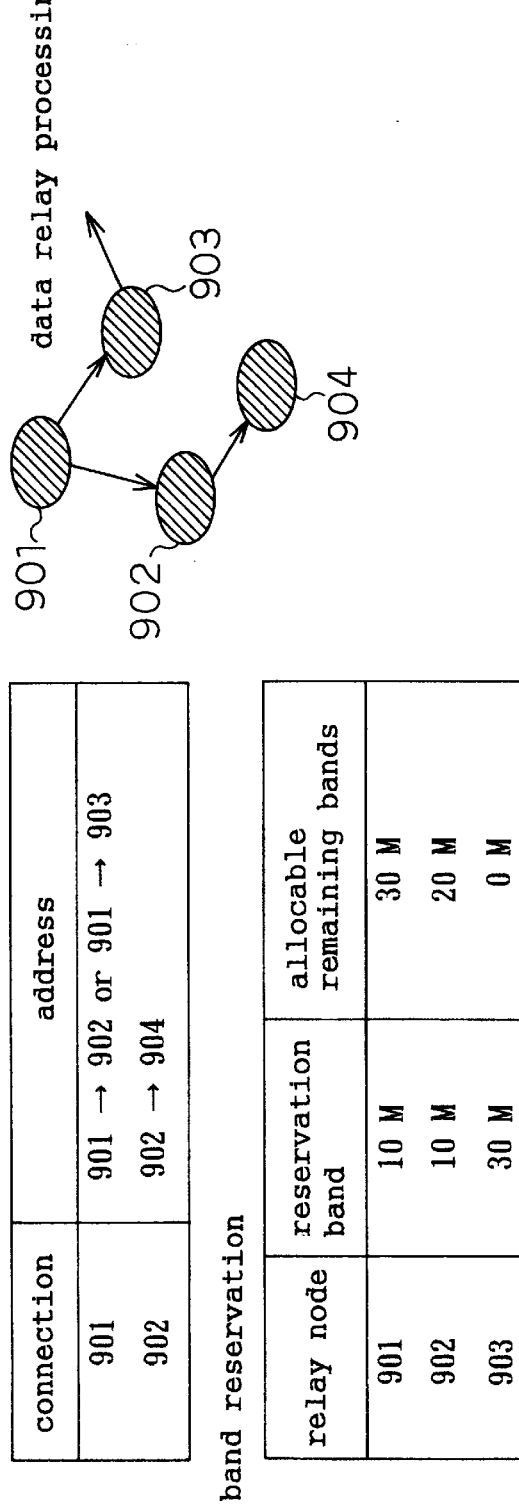
FIG. 9 shows a diagram for describing information managed by an occupied circuit control unit.

Next, FIG. 9 shows a diagram for describing information managed by the occupied circuit management unit. The arrangement information management part 302 shown in FIG. 8 manages where each of the data relay processing units 31 is connected for the neighboring data relay processing unit.

In an example of FIG. 9 the data relay processing unit 901 is connected to the data relay processing units 902 and 903.

For example, as a protocol for conveying routing information among routers which is a relay unit for packets in the Internet field among the routers, RIP (Routing Information Protocol) or OSPF (Open Shortest Path First) have been used conventionally. In the present invention, conveying protocol of route information such as RIP or OSPF may be used for arrangement information of the data relay processing unit.

The reservation condition management part 301 manages information on reserved bands or allocable remaining bands for each of the data relay processing units. In an example of FIG. 9 the data relay processing unit 901 is allocated as bands of 10M. Information on bands may be a sum of transmission bands for each of the data relay processing units or allocation information for individual application.

The allocable remaining bands have 30M. The occupied circuit management part 303 records as an occupied circuit or manages a sequence of the data relay processing units where transmission bands are reserved among terminals for sending and receiving data. In an example of FIG. 9 the data relay processing units 901, 902, and 904 are registered as in the same route.

For example, in the case where data (image or speech sounds) is sent to the receiving terminal connected to the data relay processing unit 904 from the sending terminal of the data connected to the data relay processing unit 901, bands are secured for each of the data relay processing units and the data relay unit for relaying data is registered with the occupied circuit management part.

After the registration the data is transmitted by relaying the reserved routes (901→902→904). And in the same way as a method carried out for the band reservation, information on assign of the occupied circuit in the past between 2 or more terminals is managed at the occupied circuit management unit and in accordance with the conditions where the occupied circuits have been assigned in the past the data relay processing units that the new bands should be reserved or communication price may be determined.

For example, it is possible to allow occupied circuits with many numbers of assigns not to generate exchange processing of the new occupied circuits as much as possible as for the effective term, the similar effects as described above can be expected. By the number of the assigns added for each occupied circuit it is possible to prevent the unfairness of the network usage of rapid deterioration of the transmission quality.

Figure 10:
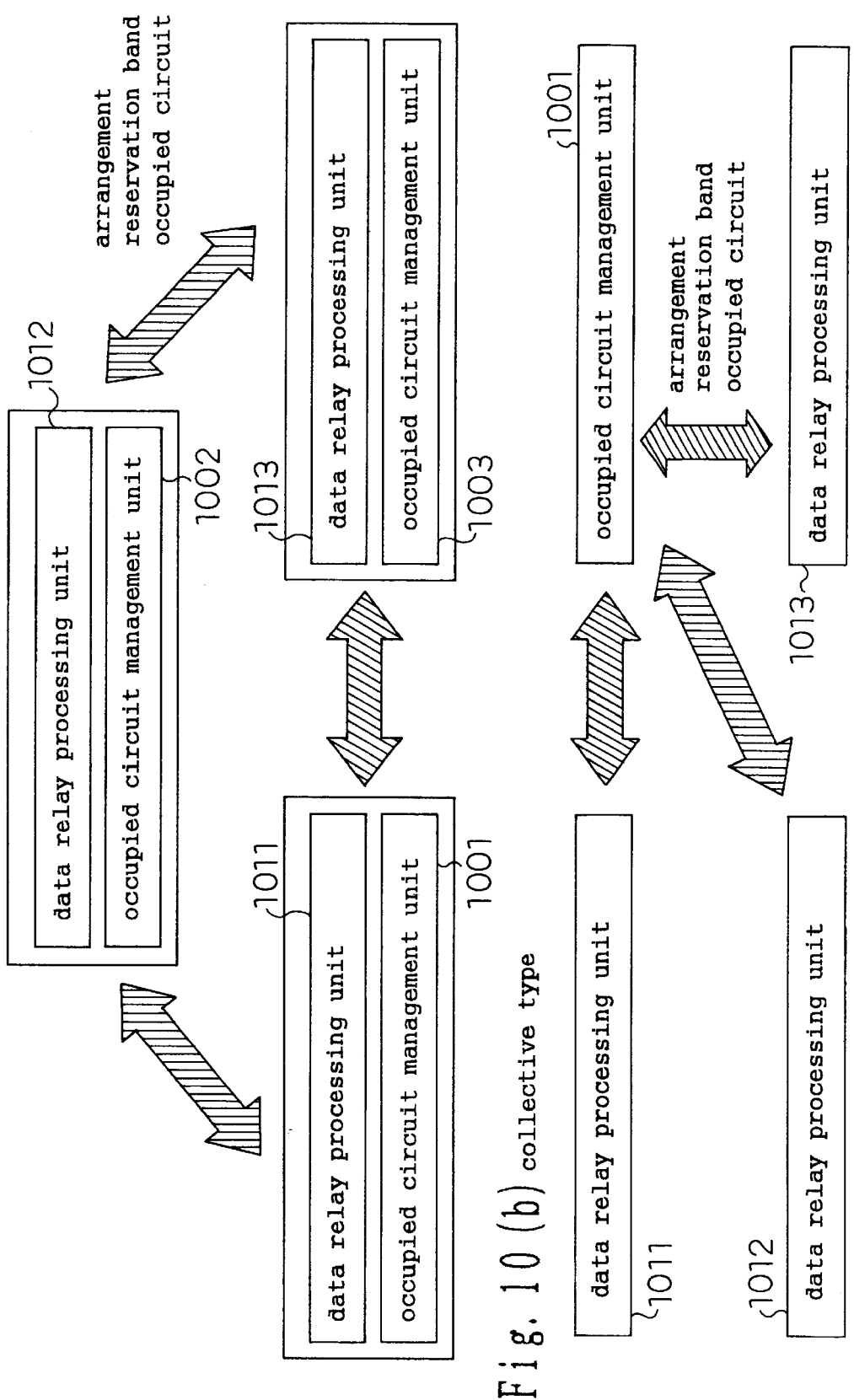
FIG. 10(*a*) is a diagram for describing a dispersion-type in the relationship between an occupied circuit control unit and a data relay processing unit.

Next, FIG. 10 shows a diagram describing the relationships between an occupied circuit management unit and a data relay processing unit.

As shown in FIG. 10(*a*), occupied circuit management units 1001 to 1003 may be provided in data relay processing units 1011 to 1013 respectively (diversion type) or as shown in FIG. 10(*b*) one occupied circuit management unit 1001 may manage a plurality of data relay processing units 1011 to 1013 (collective type) The former is highly resistant to trouble even when one data relay processing unit is out of order but traffic for information exchange (such as arrangement conditions along the transmission path of a data relay processing unit, reservation conditions of a band of a data relay processing unit, and conditions of occupied circuits) increases. The latter, on the contrary, are prone to trouble but can reduce traffic for information exchange.

Figure 11:
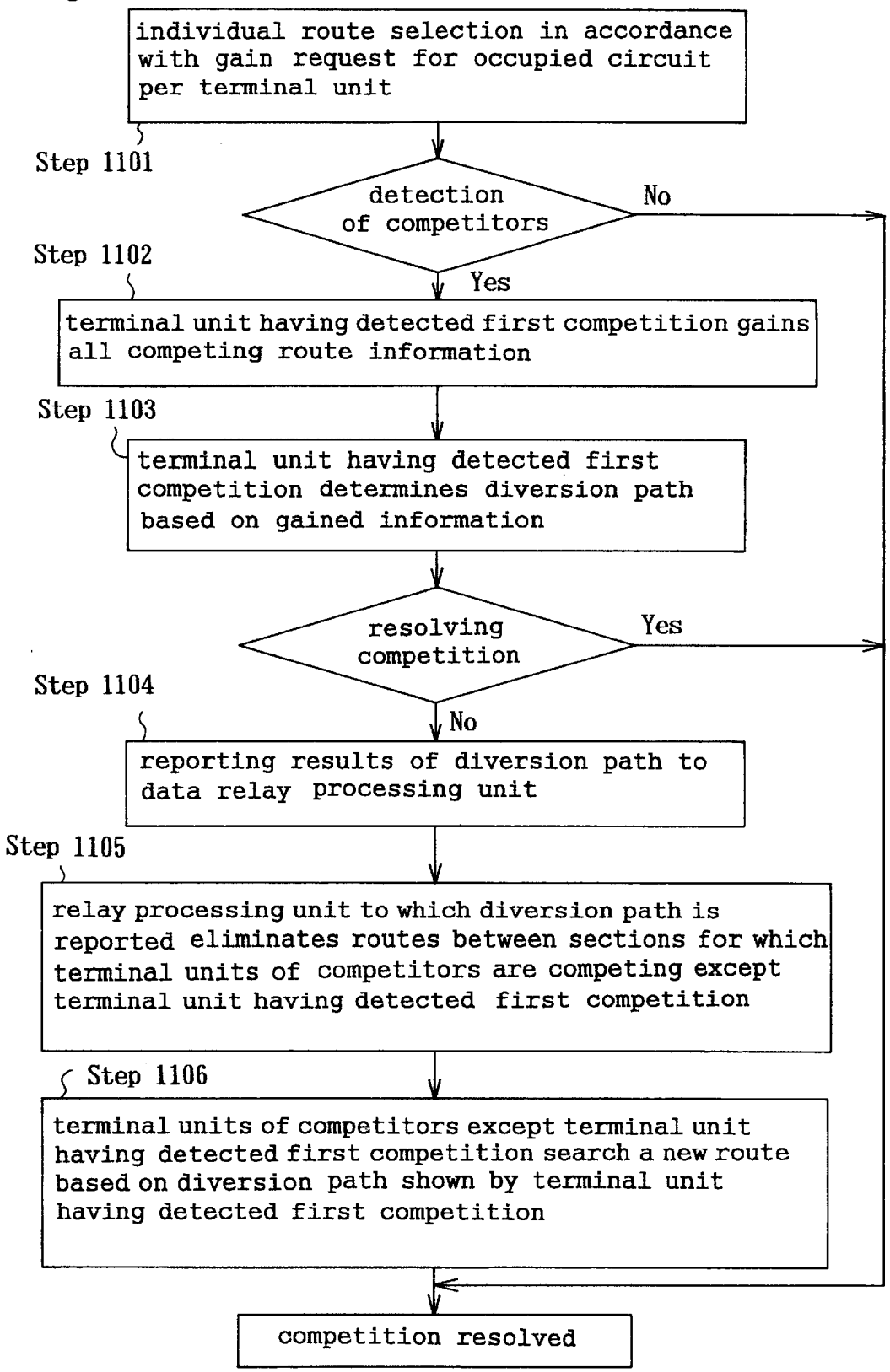
FIG. 11 shows a flowchart for describing a method for solving competition in the case of the occurrence of the competition for band reservation between more than one terminal.

Next, FIG. 11 shows a diagram describing a method for resolving competition in the case that competition occurs relating to band reservation among two or more terminals.

For example, in the case that an access request occurs at one server from a plurality of terminal units and a large number of bands occurs the possibility that requests for many band reservations occur is larger than the band width in actual existence. In the case that terminal units where competition occurs assign bands to each other and can't resolve the competition (in the case that bands can't be secured) occupied circuits assign themselves (management of bands and occupied circuits according to the guidance of terminal units).

In the case that the security of new occupied circuits is necessary there is a possibility that a plurality of routes can be selected. In the case as for a standard of route selection the judgment whether reserving or assigning occupied circuits or bands may be based on information on the usage record of occupied circuits or bands, available assign bands, load conditions of data relay processing units or information on assign of bands or occupied circuits.

Between data relay units, a gain function (f) shown as follows may be defined to determine a data relay unit to relay the next data (management of bands and occupied circuits according to the guidance of the data relay processing unit).

$$f=C/(R \cdot B \cdot K) \qquad \text{[Equation 1]}$$

Wherein C is a circuit capacity which is able to be reservation, R is a number of assigns of occupied circuits, B is a load of the data relay unit and K is a number of assigns of bands.

The gain function shown in Equation 1 is provided based on the following strategies. 1) Select a transmission path where the remaining circuit capacity is large from a data relay processing unit which is connectable from its own data relay processing unit, 2) select a circuit where the number of assigns of occupied circuits is few (because when the assign increases as a whole the overhead of assigns cannot be ignored) and, 3) select a data relay unit where a load of the data relay processing unit is small (here a load may be defined as remaining amount of buffer or may be defined as a processor load for processing data), 4) bands where the number of assigns of bands were few in the past becomes the object of assign. For bands with many assigns as a whole, overhead for assign cannot be ignored.

In addition, by reflecting actual occupied circuits or the past usage efficiency of bands in the gain function as coefficients, it can be expected to increase the usage efficiency for the whole network. Communication cost may be calculated out based on the gain function.

Lastly, a method for terminal units to provide occupied circuits is described by using FIG. 11 and citing an example.

1) First, as shown in Step 1101 of. FIG. 11 each terminal unit selects routes individually with the algorithm of Dykstra (one method of algorithm seeking the shortest route) in accordance with gain requirement of occupied circuits (usage band, terminals where requests have occurred, terminals at the opposite end of the connection (normally a server)) generated by the user request and reports the request for allocating bands to the occupied circuit management part (for example select a route with a big gain from the gain function in the foregoing).

As for a method for passing data through the determined route, in the case of the Internet, source routing can be utilized. That is to say, by having described all of the IP addresses of a passing router in advance the data can be passed through the determined route.

2) And as shown in Step 1102 of the same Fig, with respect to a competition route, the terminal unit which has detected the competition for the first time negotiates individually with all of the competitors to gain the route information competitors are competing for (for example information that each data relay processing unit or the occupied circuit management unit manages such as assigns of bands or occupied circuits).

3) Next, as shown in Step 1103 of the same Fig, the terminal unit which has detected the competition for the first time determines the deviation circuit based on gained information (for example a route with bigger gain function is selected).

4) And as shown in Step 1104 of the same Fig, in the case that the competition cannot be resolved, the result of the deviation circuit is reported to the data relay processing unit where competing routes are utilized.

5) Next, the relay processing unit to which the deviation circuit is reported eliminates its own route (rejection may become possible). That is to say as shown in Step 1105 of the same Fig, the relay processing unit to which the deviation circuit is reported eliminates the routes between the sections where terminal units of the competitors other than the terminal unit that has detected the competition for the first time are competing.

6) And their own routes are searched in reference to the competitors deviation circuits. That is to say, as shown in Step 1106 of the same Fig, the terminal units of the competitors other than the terminal unit which has detected the competition for the first time search their own new routes based on the deviation circuits shown by the terminal which has detected the competition for the first time.

Next, as shown in FIG. 12 the data relay processing units themselves may gain arrangement condition of the data relay processing unit, the reservation conditions of the bands, the setting conditions of the occupied circuits so as to determine the data relay processing units to be relayed next (setting of the transmission bands or occupied circuits) (FIG. 12(*a*)). The terminal unit may also determine the data relay processing unit to be relayed in the same way (FIG. 12*b*).

As shown in FIG. 10(*a*) an occupied circuit management unit may be provided for each data relay processing unit (diversion type), as shown in FIG. 10(*b*), one occupied circuit management unit may manage a plurality of data relay processing units (collective type).

The present invention may possibly be applied to not only the Internet but also to the networks where band reservations are possible at the data link level such as ATM or IEEE 1394.

A program to make computers carry out all, or part of, the respective steps described in the above mentioned mode can be recorded in a recording medium such as a magnetic disc or an optical disc to form a program recording medium. By using such a program recording medium and by installing said program to a computer the same processing as described above may be carried out. In this case the same effect as described above can be gained.

The present invention may also be implemented in a software manner by using a computer or may be implemented in a hardware manner through the configuration of specified circuits.

As described above, according to the present invention, with respect to the above mentioned problem (1) by using information on a term where transmission bands can be assigned or exchanged and on necessary costs at the time of usage schedule of network resources or a transmission band reservation as a usage record, the managing of transmission bands and communication price based on the usage schedule or the usage record by the users of the transmission bands is performed, and usage efficiency of the transmission path can be expected to increase.

With respect to problem (2), in the case that a plurality of transmission resources are selectable when reserving transmission resources (bands), by utilizing information on goodness of fit exhibiting the possibility of selection for each transmission resource which is able to be processed and information of the deadline time of selection, and by reporting goodness of fit between resources where transmission resource reservations are possible, the setting of the communication price at the time of resource usage is prevented from rising so as to increase the usage efficiency of the transmission path.

In addition, by dynamically changing the advertisement intervals of the route information according to the processing conditions (loads of terminals, buffer capacity utilized for data processing, transmission quality, available transmission band width) of the terminals with respect to relay processing of the data, it becomes easy to exclude terminals carrying out relay processing of overloaded data from the object. By doing this it becomes possible to carry out relay processing of data by easily selecting terminals of relay processing for data without high loads, and therefore it can be expected to increase the usage efficiency of the transmission path as a whole network.

By doing this in accordance with usage schedules or usage conditions of transmission quality or resources (transmission bands) of the network, the usage efficiency of the resources of the whole network is increased by allocating the transmission bands or determining the communication price.

Figure 13:
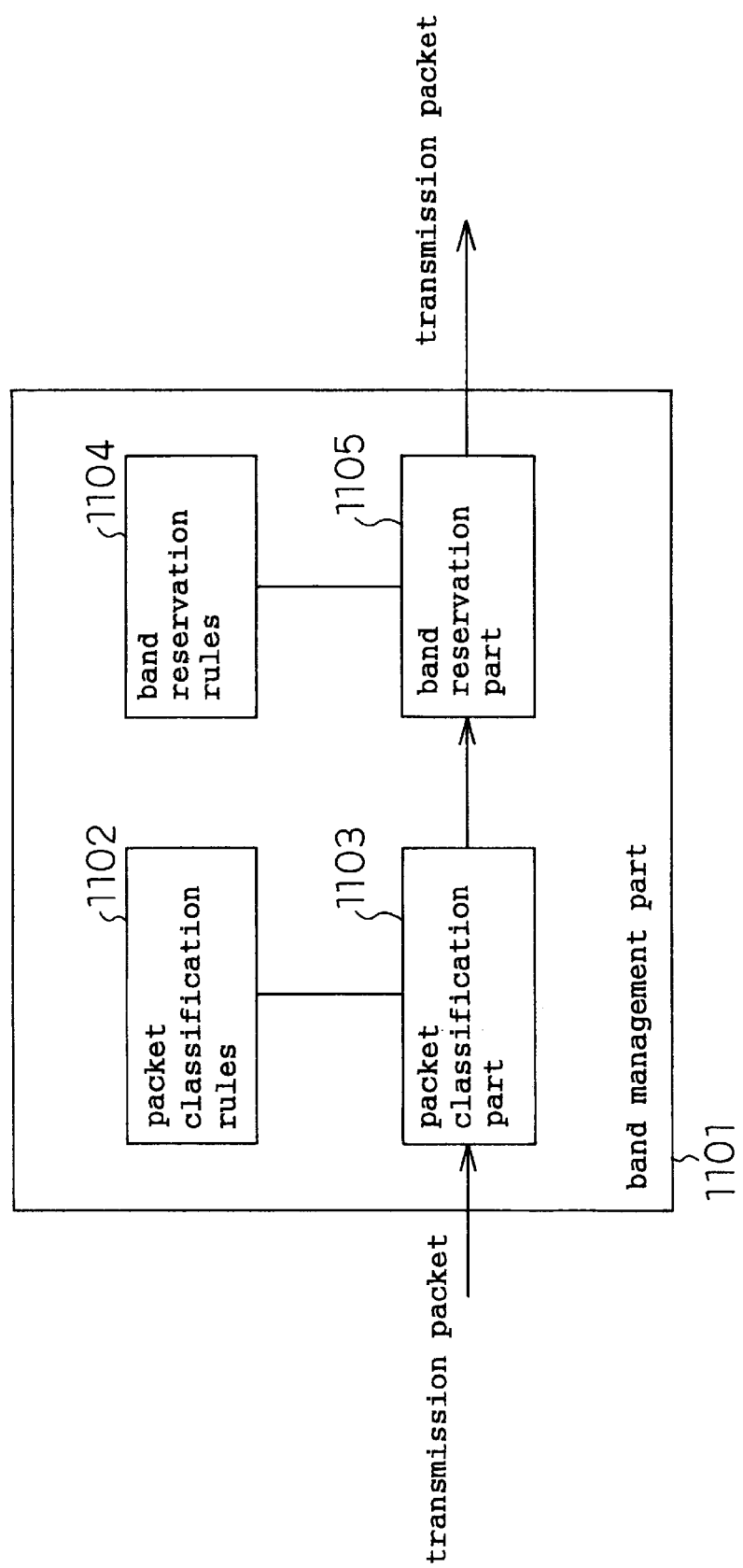
FIG. 13 shows a diagram describing a method of making band reservation according to the present invention.

FIG. 13 shows a diagram for describing a method for carrying out band reservations according to the present invention.

As for rules for classifying packets in the band management part 1101, classifications or the like by addresses (for example addresses or IP addresses of the sources, IDs which are able to recognize types of flow) or port numbers, protocol types (for example UDP, TCP, HTTP, or RTP) can be considered.

Those classification rules are described in the packet classification rules 1102 and, based on these classification rules, for example a packet classification part 1103 for classifying packets with the same address, IP address, to the same processing groups is provided (instead of the same address, IP address, IP packets delivered to the same subnet or multicast address may be classified into the same processing group).

According to the band reservation rule 1104 describing rules for reserving transmission bands, regulations for transmission quality are described. For example, packet loss ratio, delay time and jitter are described. In the band reservation part 1105 the transmission bands dynamically are secured for packet groups classified to the same processing group so as to satisfy the transmission quality described in the band reservation rule means 1104. For example, in the case that the transmission band of IP packets having the same address, IP address uses 1 Mbps and the description of the band reservation rules should control the packet loss ratio to become 0%, the band reservation part 1105 reserves the transmission band of 1 Mbps.

In the case that the transmission band of IP packet having the same address, IP address, fluctuates greatly, the observed average assign band is secured and whenever the average assign band fluctuates greatly the reserved assign bands may be changed to have the required quality. In the case that IP packets with the applicable IP address cannot be observed, the transmission is supposed to be completed and the reservation of bands are opened.

In the case that a plurality of address, IP addresses, exist (in the case of the existence of a plurality of receiving terminals), because there is an upper limit to the transmission bands which are able to be reserved, it is necessary limit bands to be able to be reserved. As for that method a method for describing absolute band width that is able to allocate for each address, IP address (may include protocol types or port numbers), a method for describing relative ratio (percentage or the like) or a method for describing the order of priority for allocation can be considered.

In the case that the order of priority is described, a method exists for allocating necessary assign bands following the order of addresses, IP addresses, from high priority (there is a possibility that a transmission band may not be allocated to addresses, IP addresses, of a low priority order), and a method exists for determining a ratio of the upper limit of the bands allocated for each address, IP address, base on the order of priority.

Figure 14:
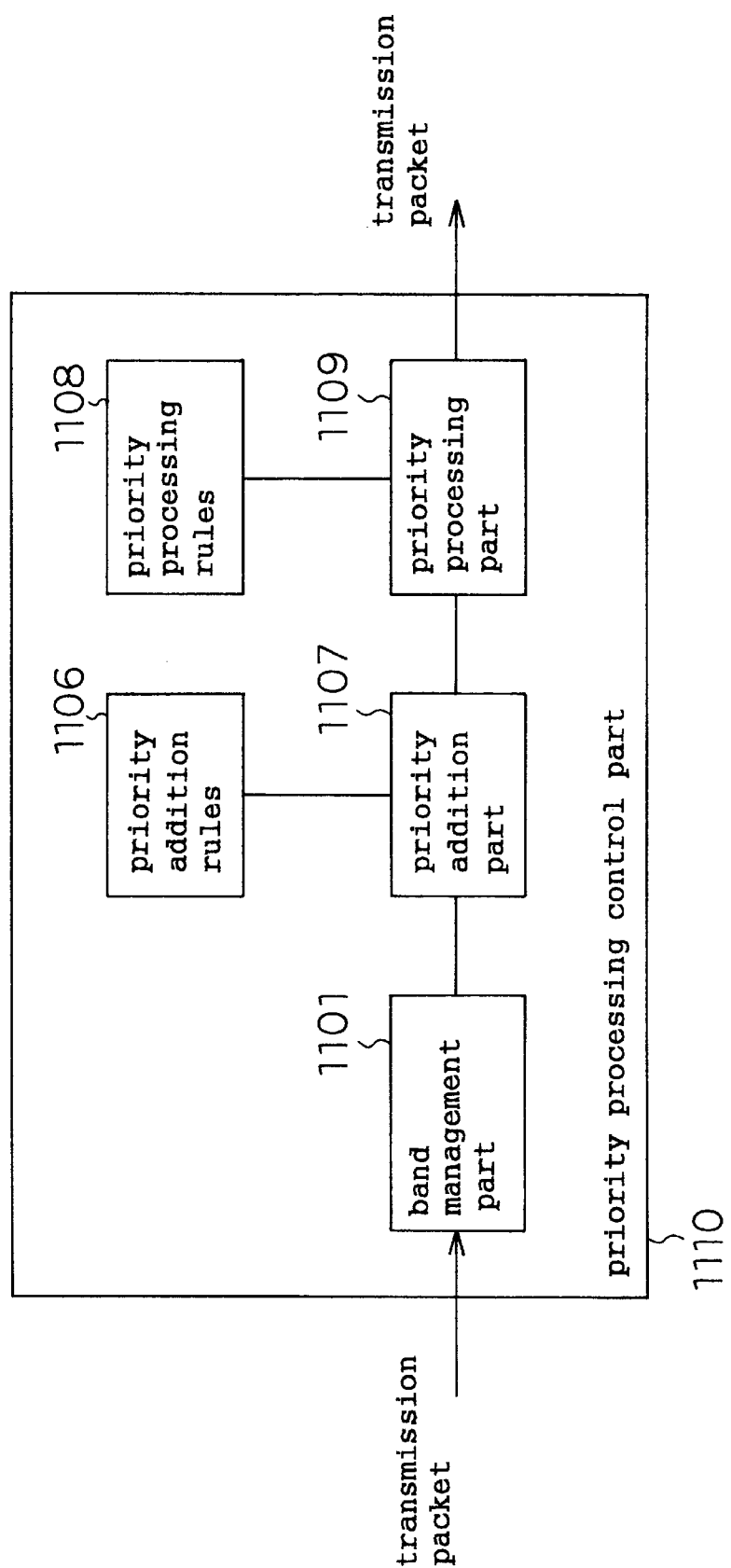
FIG. 14 shows a diagram for describing a method of adding priority information to IP packets.

FIG. 14 shows a diagram for describing a method for adding priority information to IP packets.

In the case that the priority transmission is processed within the transmission band which has been reserved (1110), it becomes a problem to add priority information to IP packets. With the same address IP packet, a priority addition part 1107 is provided for adding a priority to IP packets based on priority addition rules 1106 for managing the standard for adding a priority and the standard for adding priority.

As for the standard for adding the priority, a method for having determined a priority to be added in advance based of the IP address of the sender, port number and protocol type and a method for dynamically changing by the indication of the user are considered (the user indicates the IP address of the source, port number and protocol types of which the priorities are desired to be raised).

The priority processing unit 1109 is a module where the priority of processing of packets is carried out based on priority processing rule 1108 added to IP packets such as DiffServ.

Figure 15:
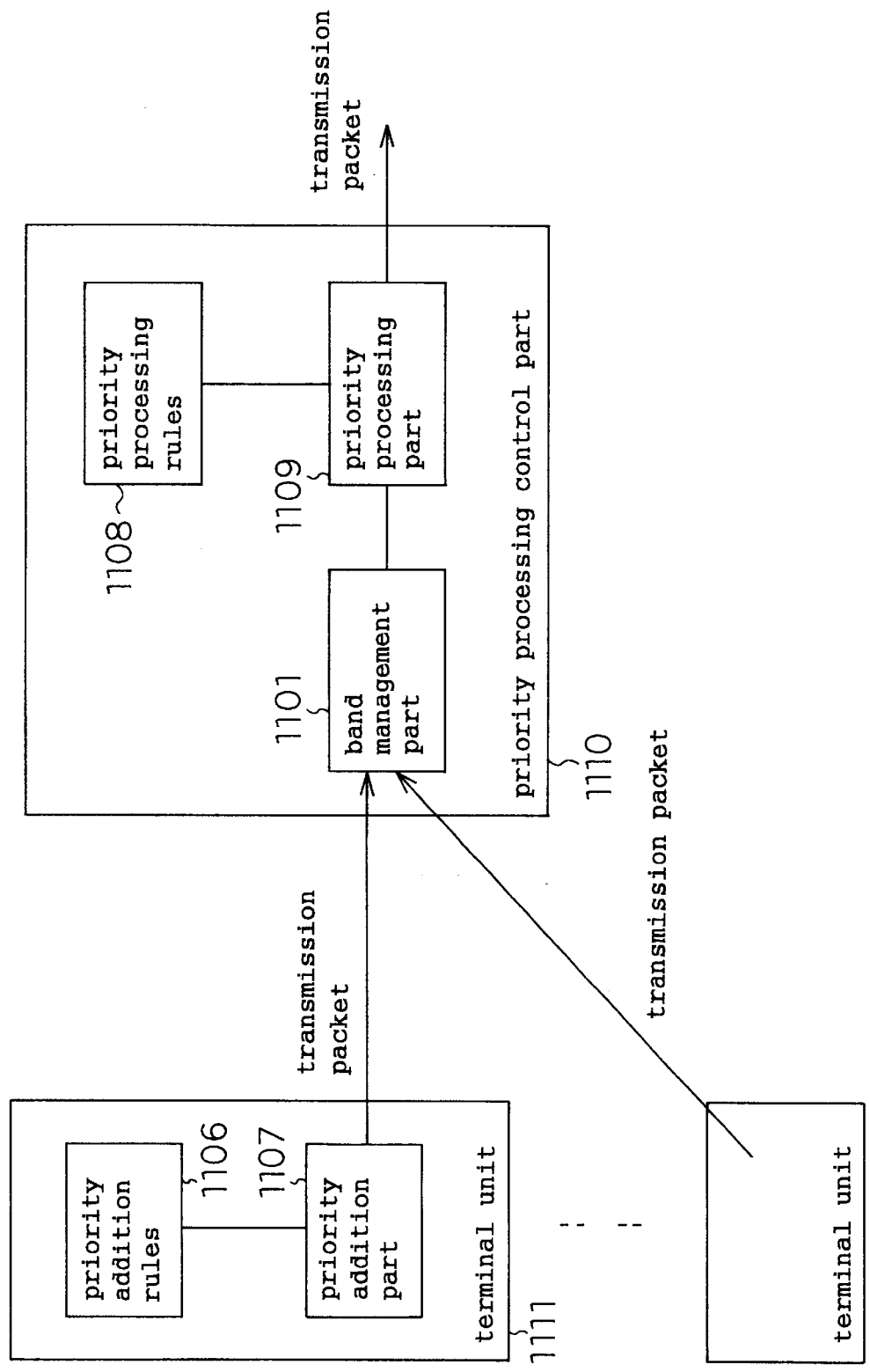
FIG. 15 shows a diagram for describing a method of adding priority information with a terminal unit carrying out information dispatch.

FIG. 15 shows a diagram describing a method for adding priority information at the terminal unit 1111 for carrying out information dispatch.

In an example of the figure instead of adding priority information after the classification for each address, IP address, the terminal unit 1111 for carrying out information dispatch adds priority information. The advantage of the configuration in FIG. 14 is that it doesn't need a function to add priority information to a terminal unit for carrying out information dispatch.

The advantage of the configuration of FIG. 15 is that it doesn't need a function to collect packets for each address, IP address, in the priority processing control part 1110.

Figure 16:
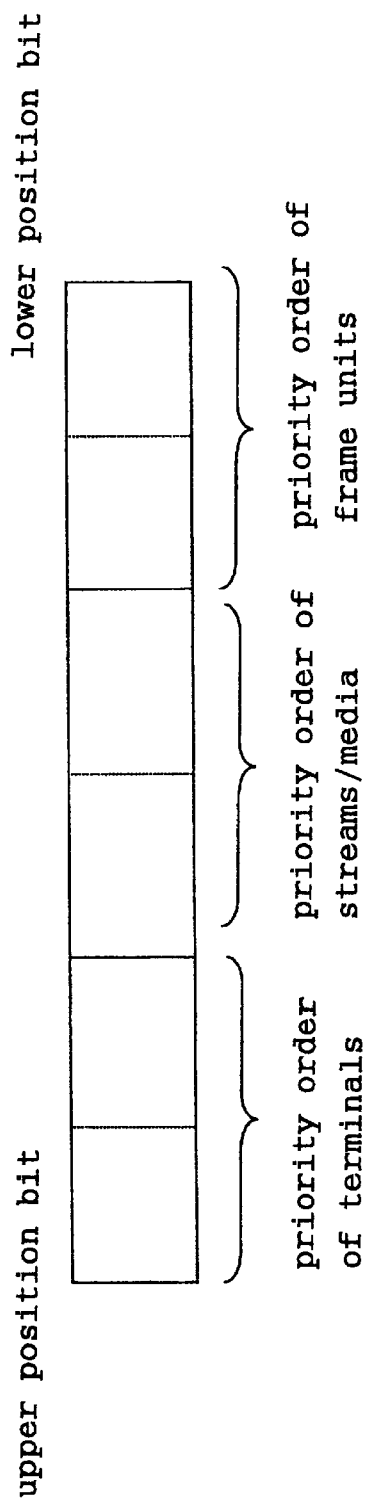
FIG. 16 shows a diagram for describing a method of adding priority.

FIG. 16 shows a diagram for describing a method for adding priority.

In an example of the Fig, priority of the terminals, priority for each medium (for example priority is added to every media such as image, speech sound), priority for each frame (for example a priority is added to each of the intraframes or interframes of images, as for speech addition of priority is changed between voiced parts and unvoiced parts) are allocated with 2 bits each from the top bit in sequence. It is not necessary to utilize all of those priorities as priority of terminals, priority for each medium or priority of each frame.

As is clear from the above description, the present invention as listed from one to thirteen has an advantage where the usage efficiency of the resources of the whole network can be further increased.

Next, an information drop unit and an information drop method of the present mode according to the present invention as listed from fourteen to nineteen are described in reference to the drawings. In this specification, the word "contents" means multimedia information such as image, speech and text.

Figure 17:
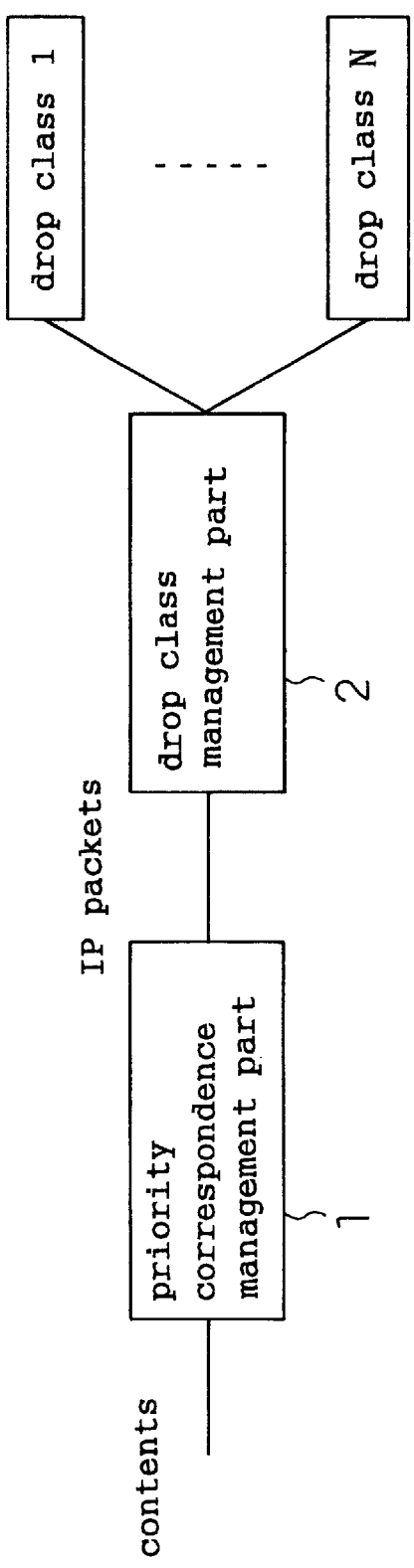
FIG. 17 shows a block diagram with respect to an information drop unit for carrying out packet drop according to the processing priority added to the contents in accordance with the first mode of the present invention.

FIG. 17 shows a diagram illustrating the first mode of an information drop unit according to the invention which carries out packet drops in accordance with the processing priority added to the contents. The information drop unit in FIG. 17 comprises priority corresponding management part 1 for making the processing priority added to the contents correspond to the priority field of the packets in the Internet protocol in the contents (contents such as moving images, speech, and text) divided into packets of Internet protocols (abbreviated as IP packet hereinafter) and a drop class management part 2 for classifying packets into drop classes having at least two or more different drop probability based on the priority added to the packet and for dropping said packet according to the network load.

The priority corresponding management part 1 may be at either the sending terminal side or the receiving terminal side or may be at the gateway or the router.

Figure 18:
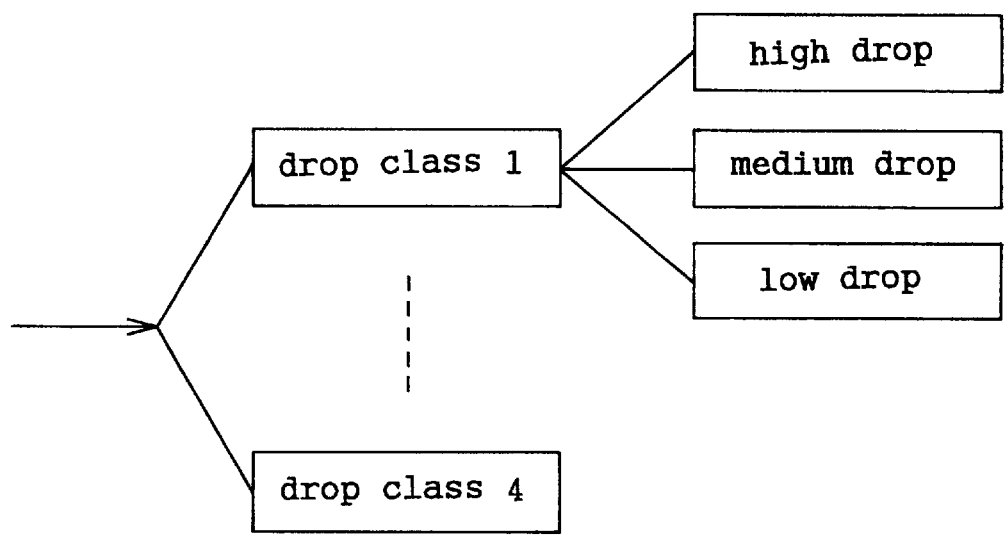
FIG. 18 shows a diagram for describing a basic operation of DiffServ in the above first mode.
Figure 24:
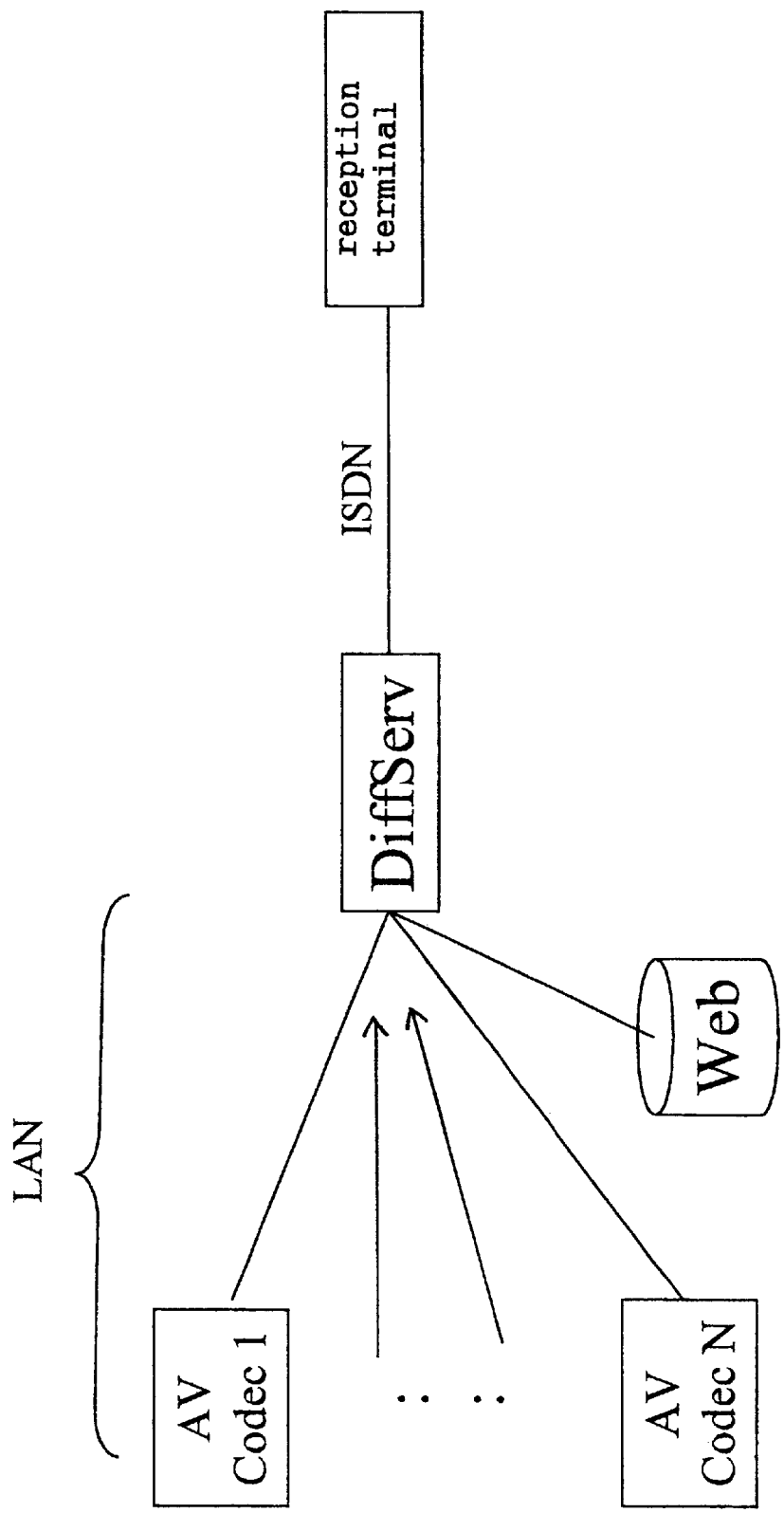
FIG. 24 shows a representative configuration view illustrative a typical example of the mode according to the present invention.

The feature of dropping (the drop class management part 2) may use DiffServ as shown in FIG. 18. FIG. 24 shows that example. That is to say in the LAN within the premises a plurality of monitoring cameras AVCodec 1-AVCodecN, Web and DiffServ exist, and AV data outputted from each apparatus are inputted to DiffServ. The output from the DiffServ is sent to a receiving terminal such as a private home through the ISDN circuit. This application is an example applied for a gateway with different transmission bands.

FIG. 18 shows a diagram for describing a basic operation of DiffServ. As for a mechanism for dropping IP packets, a structure of DiffServ (a packet drop processing technology using a priority field of IP packets) standardized at IETF can be utilized.

This DiffServ comprises, as shown in FIG. 18, drop classes with four different drop probabilities, and each class has a queue of three different drop probabilities.

Figure 19:
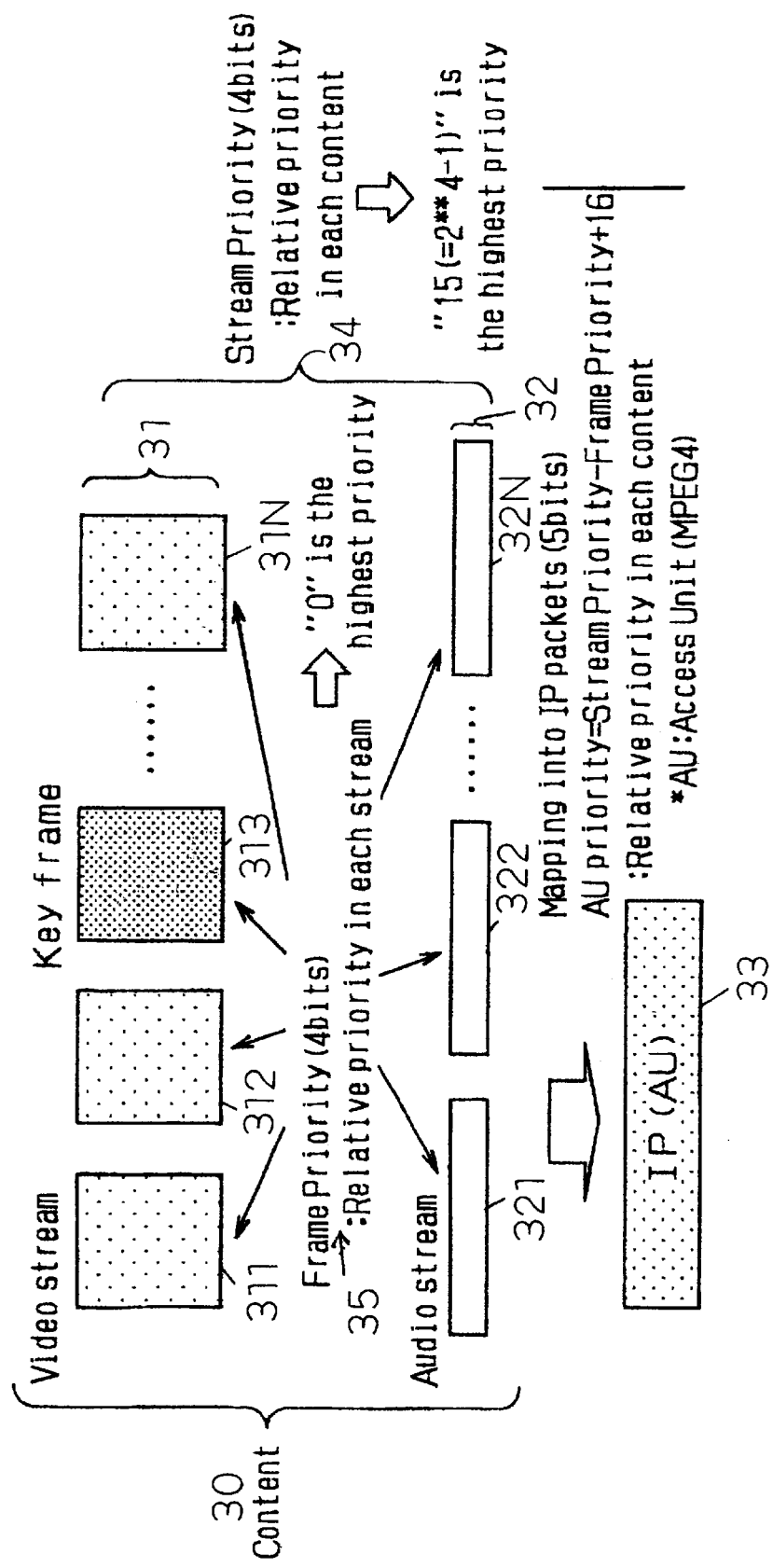
FIG. 19 shows a diagram for describing a method of making the priority of the contents correspond to IP packets according to said first mode.

FIG. 19 shows a diagram for describing a method for making priority of the contents correspond to IP packets which is carried out at the above mentioned drop class management part 2. In an information drop unit shown in FIG. 17 for the standard of the priority the priority 34 (stream priority (4 bits): relative priority in each content) based on the types of stream such as images, speech or control information and the priority 35 (frame priority (4 bits): relative priority in each stream) based on types of frames of image or speech exist.

For the priority of types of frames 4 bits are allocated with "0" being the highest priority. For the priority of types of streams 4 bits are allocated with "15 (=2**4−1)" being defined as the highest processing priority.

On the other hand, to show the priority of IP packets only 5 bits are allocated. Therefore, to make the processing priority of the two types added to images or speeches as described above correspond to the priority of IP packets, processing priority added for types of streams and a processing priority added for types of frames are devised to be added with offset values.

In an example of FIG. 19 as shown in Equation 1, by setting the offset value at 16, it becomes possible to make two types of processing priority added to contents corresponding to 5 bits of processing priority of IP packets (in the case that it is applied to MPEG4, it is called AU (Access Unit) priority). There are 1 to 31 stages.

AU priority=stream priority–frame priority+16    [Equation 1]

The processing priority may not be a type of small unit such as a flame but may be a collective unit to be added with a certain dimension of frame such as GOB defined in MPEG 1. In addition, in the case of context chapters or clauses may be units. Moreover, priority of terminals maybe taken into consideration.

Figure 20:
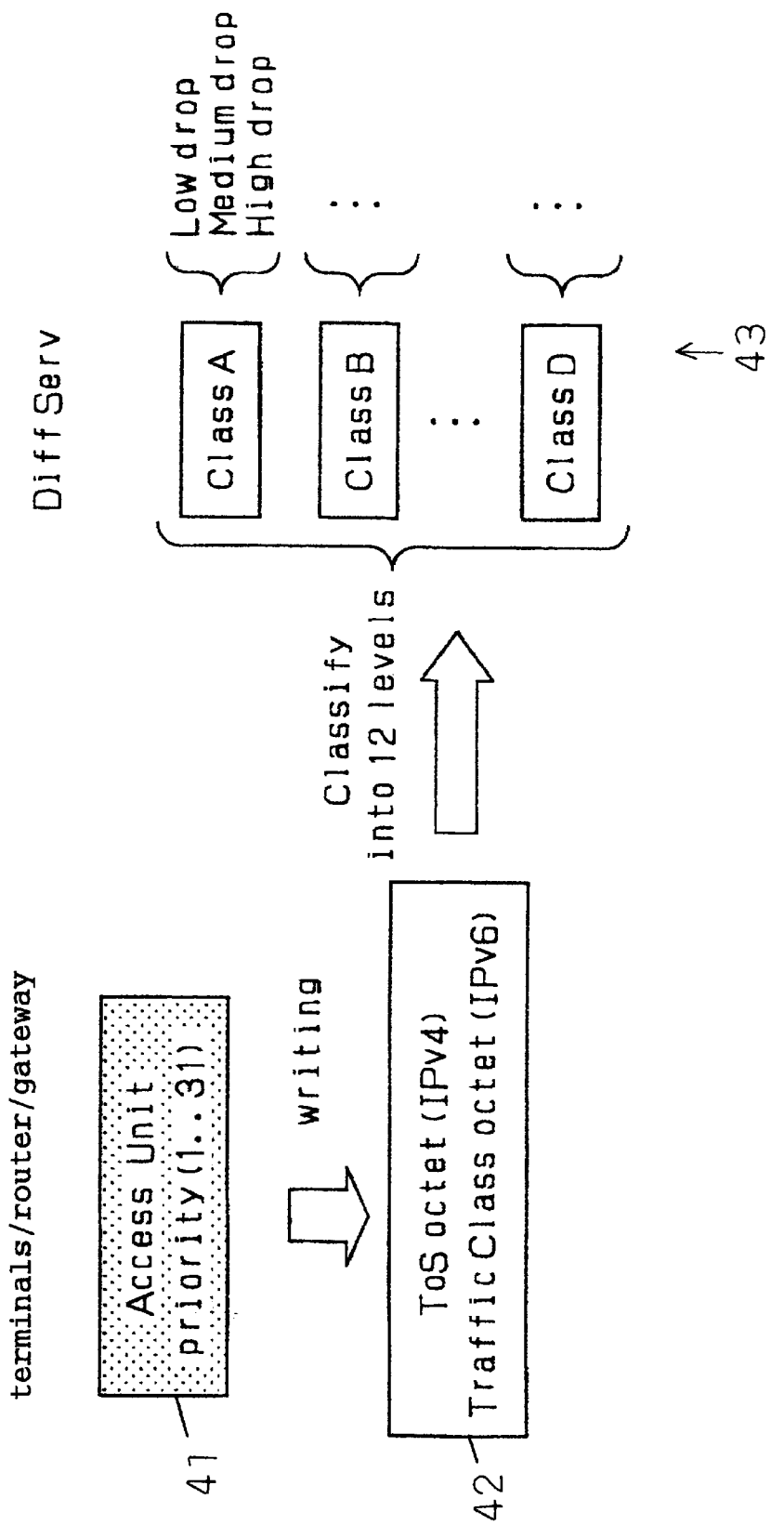
FIG. 20 shows a diagram for describing the operation of the information drop unit shown in FIG. 1.

FIG. 20 shows a diagram describing an operation carried out continuously at the above mentioned drop class management part 2 as shown in FIG. 17. As described above when the addition 42 of the processing priority 41 to IP packet is completed, in the case that DiffServ is used, it is separated into drop classes 43 with twelve stages.

As for the field for the processing priority of IP packets, ToS field is utilized in the case of IPv4 and a field of traffic class is utilized in the case of IPv6.

Figure 21:
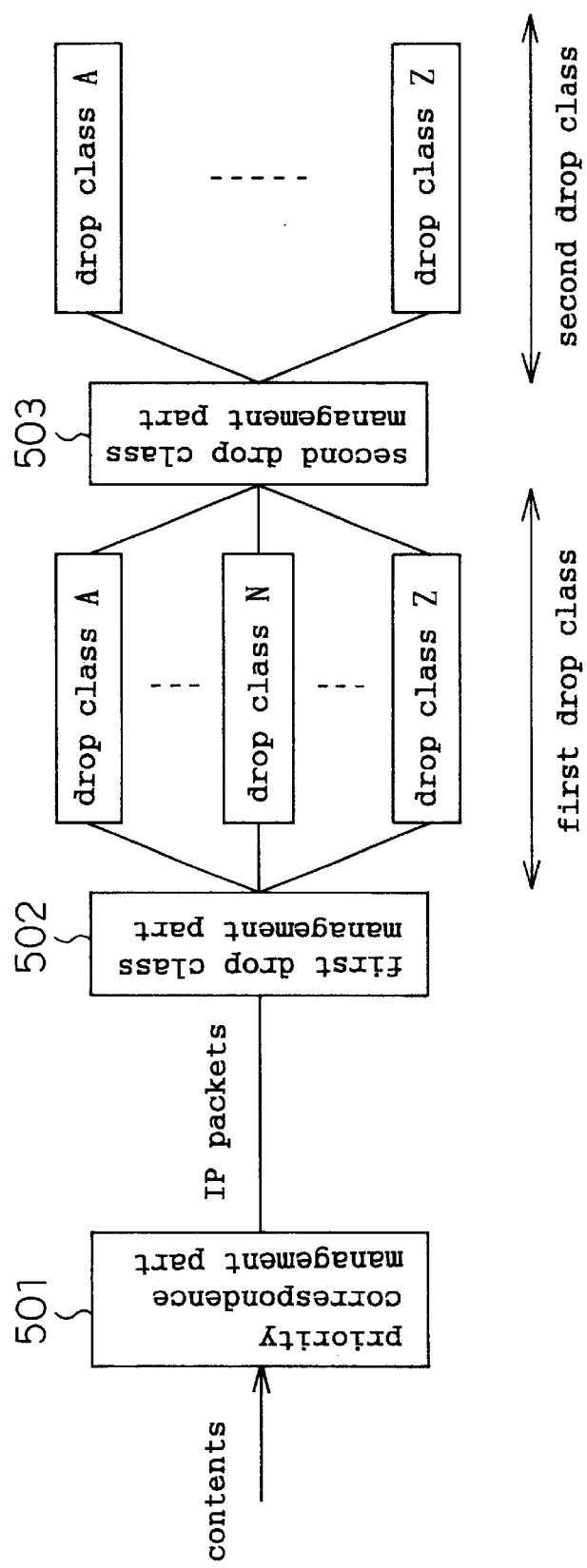
FIG. 21 shows the second mode according to the present invention, which is a block diagram for describing the information drop unit for dropping IP packets according to the priority added to the contents after classification to the pre-assigned drop class.

FIG. 21 shows a diagram illustrating the second mode of an information drop unit according to the present invention. This mode is a unit for dropping of IP packets according to the processing priority added to the contents as described above within the drop class predetermined between the sender and receiver.

The information drop unit according to this mode comprises a priority corresponding management part 501 for making the processing priority added to the contents correspond to a priority field of the packets of the contents divided into those packets of the Internet protocol, the first drop class management part 502 for classifying packets into the previously indicated first drop class based on the priority added to the packets in the above way, and the second drop class management part 503 for dropping packets according to the network load by classifying said packets into the second drop class having two or more different drop probabilities set respectively for the first drop class.

As for a method for allocating packets to the previous assigned first drop class, as described above, there is a method for classifying with the sender's address, the sender's port address, the receiver's address or the receiver's port address, in addition to that classifying with types of packets, types of protocols such as UDP/TCP http.

Figure 22:
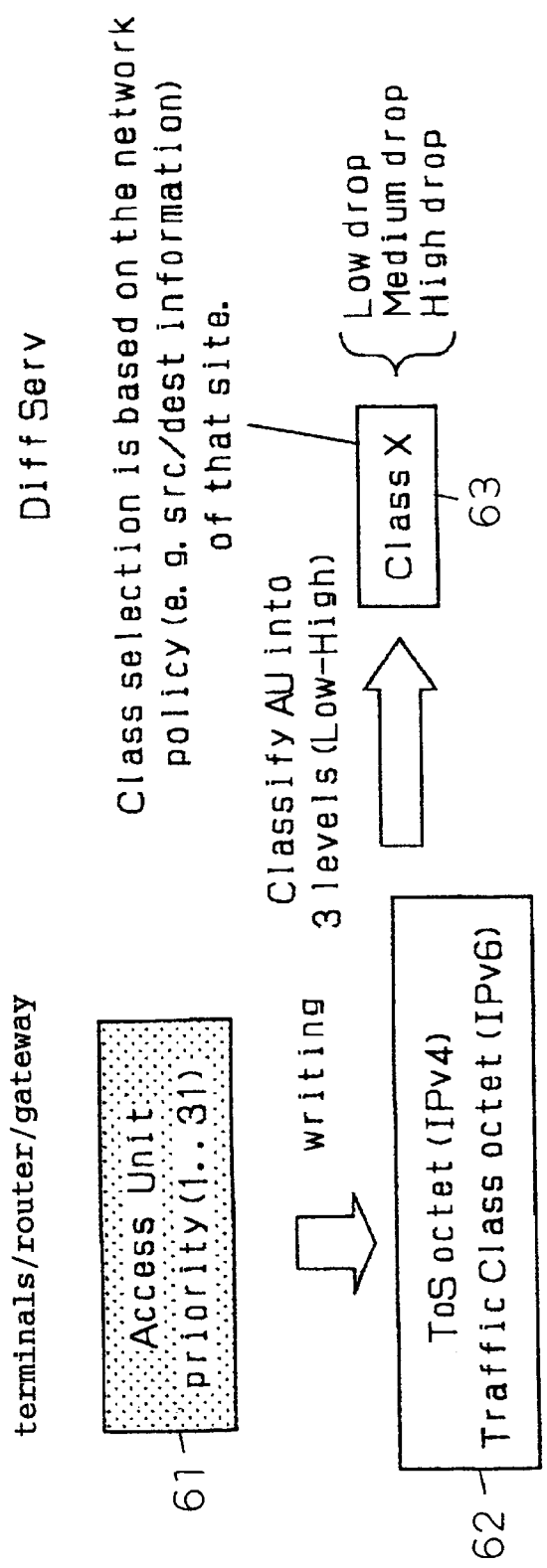
FIG. 22 shows a diagram for describing the operation of the information drop unit shown in FIG. 5.

FIG. 22 shows a diagram for describing the operation of an information drop unit shown in FIG. 21. When the addition of the processing precedent 61 to IP packets is completed the packets are written in the priority field 62 and go to the first drop class 63 which is previously assigned and classified to the drop class with three stages at DiffServ based on the priority added to the IP packet. As for a method of the present mode, compared to the method of the first mode described in FIG. 17 in the case of small width of the fluctuating value of the processing priority that is added it operates more effectively than that of FIG. 17. In the same way as FIG. 17, the priority system of the terminals may be taken into consideration.

Figure 23:
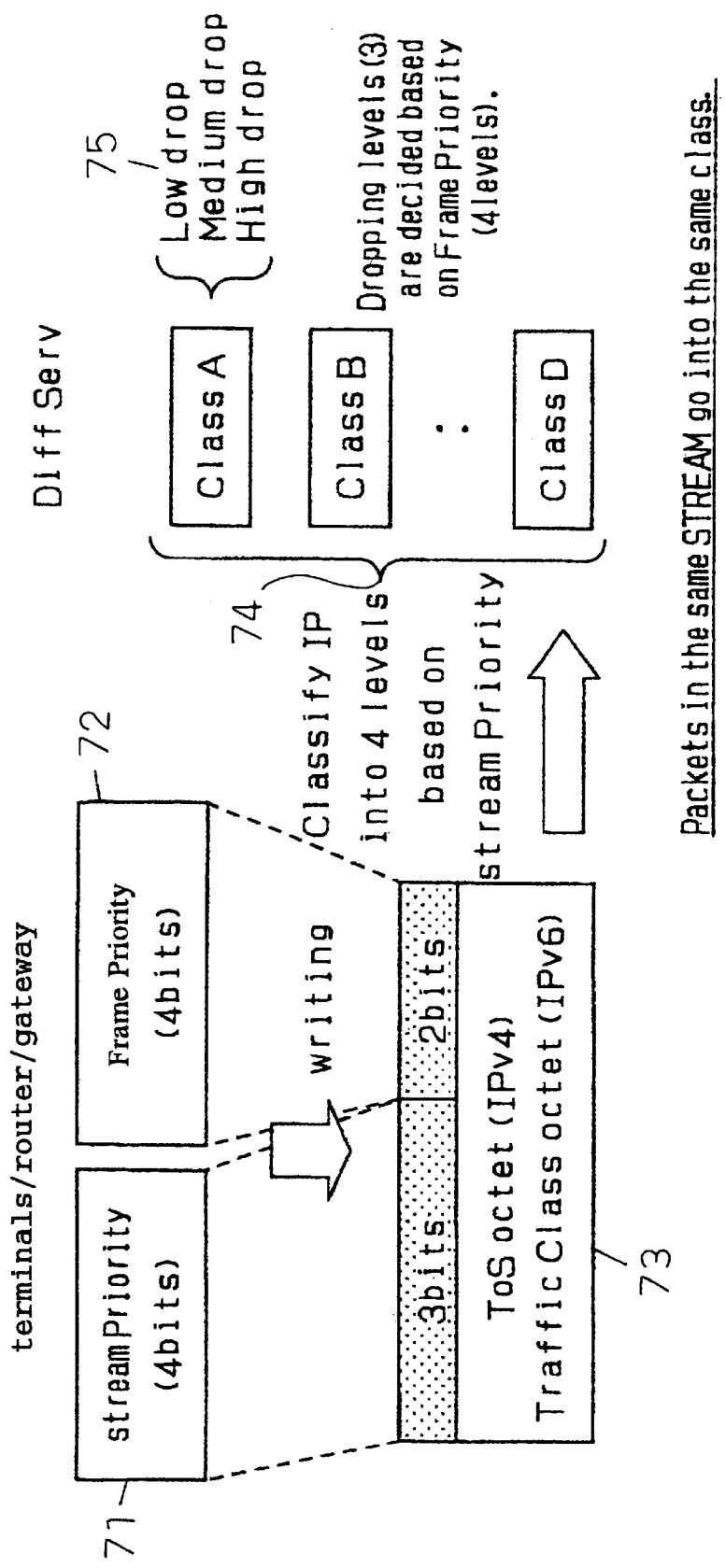
FIG. 23 shows the third mode according to the present invention, which is a diagram for describing a method of making a plurality of priorities correspond to IP packets independently.

FIG. 23 shows a view illustrating the third mode of an information drop unit according to the present invention.

The present mode has the same configuration as the information drop unit of the second mode shown in FIG. 21 but has a different method for classifying IP packets into drop classes. An information drop unit according to the present mode comprises a priority corresponding management part 501 for making processing priority 71 added with the type of stream of the contents and the processing priority 72 added with the type of frames correspond to priority field 73 of packets of the Internet protocol, a first drop class management part 502 for classification into the first drop class 74 having two or more different drop probabilities and a second drop class management part 503 for classifying each of the first drop class 74 into the second drop class 75 having two or more different drop probabilities and for dropping packets according to the network load based on the processing priority added with the type of frames or by the set unit of a predetermined size of frame (for example GOB in MPEG1 and units of chapters or clauses in context). Here the priority system of the terminals instead of the processing priority system 71 added with the stream may be allocated and a stream priority system instead of the frame priority system may be allocated.

In reference to FIG. 21 the operation of the mode is described next. Two types of processing priority added to the contents (stream priority 71 and frame priority 72) are respectively described in a region 73 of the processing priority of the IP packet independently (4 bits of the stream priority is changed to 3 bits and 4 bits of the frame priority is changed to 2 bits). At that time lowered precision of the priority cannot be avoided.

Next, the IP packet is classified into the first drop class 74 with four stages following the stream priority 71 described in the processing priority. And the classified IP packets are respectively classified into the second drop class 75 with three stages following the frame priority 72. Compared to other systems, this system has the advantage that it is possible to clearly assign a drop class by the priority described in the contents.

Though in the above described mode the processing priority added to the contents are made to correspond to the IP packets, according to the present invention it may be made to correspond to packets of RTP (Real Time Assign Protocol) (for example, by using an extension field).

The packet drop feature according to the present invention is not necessarily limited to the above described DiffServ.

Though the priority utilized in the present invention is a combination of the priority of the stream and the priority with respect to frames in the above described mode, it is not necessarily limited to that but may be a combination of all the priority by the kinds of terminals, the priority of the streams and the priority of the frames or may be a combination the priority of the terminals, the priority of the streams or the priority of streams. In addition, the port number or application unit, the priority of user units may be taken into consideration.

The priority utilized in the present invention may be sent externally from a monitoring camera or the like or may be allocated by DiffServ.

As described above according to the present invention it becomes possible to process with more flexibility than the conventional method through an information drop method for dropping said packets according to the network loads.

What is claimed is:

1. An information drop method comprising:

an input step for inputting contents in which at least a plurality of types of priorities which are used when the contents are processed are added;

a correspondence making step for dividing said contents into packets of the Internet protocol and making priorities of a plurality of types of said contents correspond to a priority field of packets of said Internet protocol;

a step for classifying said packets to, which said priority is made to correspond, into drop classes having at least two or more different drop probabilities based on said priority that is made to correspond; and a drop step for dropping said packet in accordance with the network load based on said drop classes.

2. An information drop unit comprising:
- an input means for inputting contents in which at least a plurality of types of priorities are added when the contents are processed;
- a priority corresponding management means making step for dividing said contents into packets of the Internet protocol and making priorities of a plurality of types of said contents correspond to a priority field of packets of said Internet protocol;
- a classification means for classifying said packets to which said priority is made to correspond, into drop classes having at least two or more different drop probabilities based on said priority that is made to correspond; and
- a drop means for dropping said packet in accordance with the network load based on said drop classes.

3. An information drop method comprising:
- an input step for inputting contents in which at least a plurality of types of priorities are added when the contents are processed;
- a correspondence making step for dividing said contents into packets of the Internet protocol and making priorities of a plurality of types of said contents correspond to a priority field of packets of said Internet protocol;
- a first classification step for classifying said packets to which said priority is made to correspond, into first drop classes according to previously assigned rules;
- a second classification step for classifying packets classified as such, into second drop classes having at least two or more different drop probabilities provided in said first drop class, based on said priority made to correspond; and
- a drop step for dropping said packets in accordance with the network loads based on said first and second drop classes.

4. An information drop unit comprising:
- an input means for inputting contents in which at least a plurality of types of priorities are added when the contents are processed;
- a priority corresponding management means for dividing said contents into packets of the Internet protocol and making priorities of a plurality of types of said contents correspond to a priority field of packets of said Internet protocol;
- a first drop class management means for classifying said packets to which said priority is made to correspond, into first drop classes according to previously assigned rules;
- a second drop class management means for classifying packets classified as such, into second drop classes having at least two or more different drop probabilities provided in said first drop class based on said priority made to correspond; and
- a drop means for dropping said packets in accordance with the network loads based on said first and second drop classes.

5. An information drop method according to claim 1, wherein that a plurality of types of priorities of said contents in said priority corresponding management means are an arbitrary combination of a processing priority added by a type of stream of said contents, a processing priority added by types of frames of said contents or by the set unit of a predetermined size of frames, a priority added by types of terminals.

6. An information drop method according to claim 3, characterized in that a plurality of types of priorities of said contents in said priority corresponding management means are an arbitrary combination of a processing priority added with a type of stream of said contents, a processing priority added by types of frames of said contents or by the set unit of a predetermined size of frames, a priority added with types of terminals, and a priority added with types of terminals.

7. An information drop unit according to claim 2, characterized in that a plurality of types of priorities of said contents in said correspondence making step are an arbitrary combination of a processing priority added with a type of stream of said contents, a processing priority added by types of frames of said contents or by the set unit of a predetermined size of frames, and a priority added with types of terminals.

8. An information drop unit according to claim 4, characterized in that a plurality of types of priorities of said contents in said correspondence making step are an arbitrary combination of a processing priority added with a type of stream of said contents, a processing priority added by types of frames of said contents or by the set unit of a predetermined size of frames, and a priority added with types of terminals.

9. An information drop method characterized by comprising:
- an input step for inputting contents in which at least a plurality of types of priorities are added when the contents are processed;
- a correspondence making step for dividing said contents into packets of the Internet protocols, and for making a plurality of types of priorities of said contents correspond individually to a priority field of packets of said Internet protocol independently;
- a first classification step for classifying said packets, to which said priority correspond is made correspond, into a first drop class based on one of said plurality of types of priorities being made to correspond;
- a second classification step for classifying packets, which has been classified in such a way, into a second drop class having at least two or more different drop probabilities provided in said first drop class based on other priorities than said plurality of types of priorities which have been made to correspond;
- a drop step for dropping said packets according to the network loads based on said first and second drop classes.

10. An information drop method according to claim 9 characterized in that said plurality of types of priorities are an arbitrary combination of the processing priority added with types of streams of said contents, the processing priority added with types of frames of said contents or by the set unit of a predetermined size of frames, and priority of terminals, and types of priorities utilized in said first class and said second class steps are said streams.

11. An information drop unit characterized by comprising:
- an input means for inputting contents in which at least a plurality of types of priorities are added when the contents are processed;
- a priority corresponding management means making step for dividing said contents into packets of the Internet protocols, and for making a plurality of types of priorities of said contents correspond individually to a priority field of packets of said Internet protocol independently;

a first drop class management means for classifying said packets, to which said priority correspond is made correspond, into a first drop class based on one of said plurality of types of priorities being made to correspond;

a second drop class management step for classifying packets, which has been classified in such a way, into a second drop class having at least two or more different drop probabilities provided in said first drop class based on other priorities than said plurality of types of priorities which have been made to correspond;

a drop means for dropping said packets according to the network loads based on said first and second drop classes.

12. An information drop method according to claim 11, characterized in that said plurality of types of priorities are an arbitrary combination of the processing priority added with types of streams of said contents, the processing priority added with types of frames of said contents or by the set unit of a predetermined size of frames, and priority of terminals, and types of priorities utilized in said first class and said second class steps are said streams.

* * * * *